US008694339B1

(12) United States Patent
Bunick et al.

(10) Patent No.: US 8,694,339 B1
(45) Date of Patent: Apr. 8, 2014

(54) SYSTEM AND METHOD FOR DETERMINING LOSS DATA BASED ON INDUSTRY INDICES

(75) Inventors: Claude B. Bunick, Airmont, NY (US); Chengyou Xiao, New Providence, NJ (US)

(73) Assignee: Guy Carpenter & Company, LLC., New York, NY (US)

( * ) Notice: Subject to any disclaimer, the term of this patent is extended or adjusted under 35 U.S.C. 154(b) by 0 days.

(21) Appl. No.: 13/344,202

(22) Filed: Jan. 5, 2012

Related U.S. Application Data

(63) Continuation of application No. 13/286,708, filed on Nov. 1, 2011, now abandoned.

(51) Int. Cl.
G06Q 40/08 (2012.01)
G06Q 40/02 (2012.01)
G06F 17/30 (2006.01)
G06Q 30/02 (2012.01)

(52) U.S. Cl.
USPC .................... 705/4; 705/36 R; 705/38; 705/7; 705/29; 705/37; 700/32

(58) Field of Classification Search
USPC ............................ 705/4, 36–38, 7.29; 700/32
See application file for complete search history.

(56) References Cited

U.S. PATENT DOCUMENTS

| | | | |
|---|---|---|---|
| 5,839,113 A * | 11/1998 | Federau et al. ................... | 705/4 |
| 8,046,245 B1 * | 10/2011 | Woll et al. ........................ | 705/4 |
| 8,504,393 B2 * | 8/2013 | Stewart et al. .................... | 705/4 |
| 2003/0195776 A1 | 10/2003 | Moore et al. | |
| 2004/0064346 A1 | 4/2004 | Schneider et al. | |
| 2005/0027645 A1 * | 2/2005 | Lui et al. ......................... | 705/38 |
| 2007/0203759 A1 * | 8/2007 | Mathai et al. .................... | 705/4 |
| 2008/0103841 A1 * | 5/2008 | Lewis et al. ...................... | 705/4 |
| 2009/0054079 A1 | 2/2009 | Dubinsky | |
| 2009/0204235 A1 * | 8/2009 | Dubinsky ........................ | 700/32 |
| 2009/0276289 A1 * | 11/2009 | Dickinson et al. .............. | 705/10 |
| 2011/0153368 A1 * | 6/2011 | Pierre et al. ...................... | 705/4 |

OTHER PUBLICATIONS

"Managing Catastrophic Risk by Alternative Risk Transfer Instruments", Chieh Ou Yang, University of Pennsylvania; Aug. 13, 2010.*

* cited by examiner

*Primary Examiner* — Harish T Dass
(74) *Attorney, Agent, or Firm* — Fay Kaplun & Marcin, LLP

(57) ABSTRACT

Systems and methods for evaluating basis risk associated with index based security instruments. The systems and methods calculating an element factor for each of a plurality of elements based on a modeled company loss for a plurality of events and an industry loss for the plurality of events, calculating a company loss for each element based on the element factor and an industry loss for each of the corresponding elements for each of a plurality of events, comparing the company loss for each element to the modeled company loss for each element for each of the events, wherein the comparing occurs within a layer of interest to determine a basis risk for each of the events and outputting a monetary value of the basis risk for each of the events based on each of the elements.

22 Claims, 17 Drawing Sheets

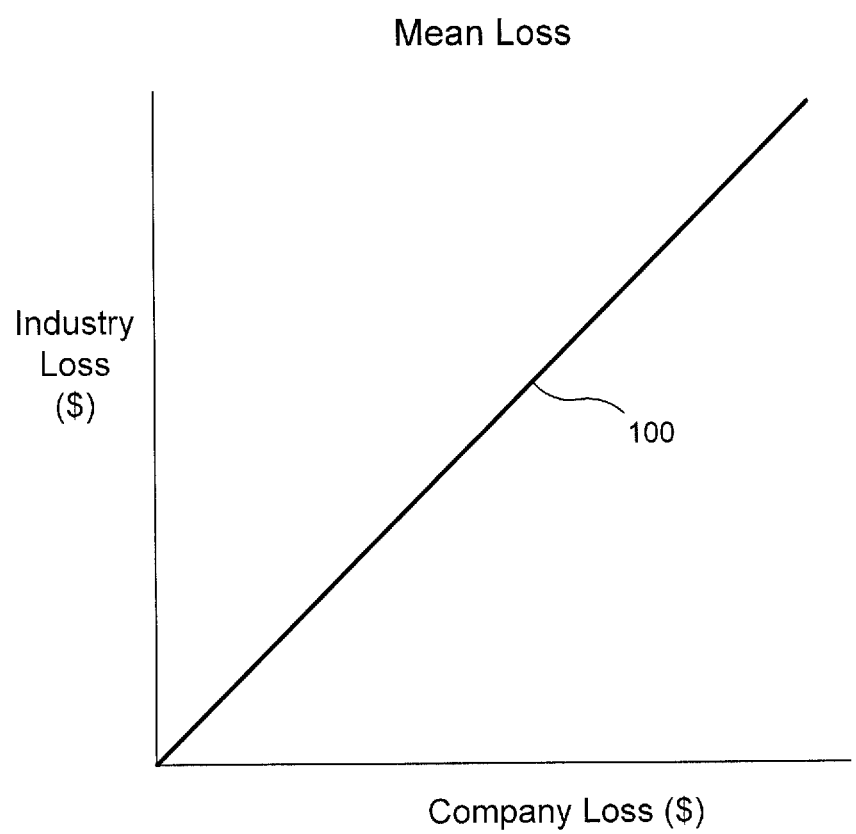
F I G. 1

| Description |
|---|
| (A) Sarasota, FL, Class 2 Hurr FL GOM GA CJ BF,<br>(B) Severity 2 CentralPressue 934.6 max wind 108.3,<br>(C) Lee, FL, countyNum = 071 |
| (A) Monroe, FL, Class 5 Hurr FL GOM DR BF CJ,<br>(B) Severity 5 CentralPressue 939.7 max wind 160.1,<br>(C) Miami-dade, FL, countyNum = 086 |
| (A) Miami-Dade, FL, Class 5 Hurr FL GOM BF,<br>(B) Severity 5 CentralPressue 926.2 max wind 163.5,<br>(C) Miami-dade, FL, countyNum = 086 |
| (A) Miami-Dade, FL, Class 4 Hurr FL GOM BF GA SC,<br>(B) Severity 4 CentralPressue 940.7 max wind 137.6,<br>(C) Miami-dade, FL, countyNum = 086 |
| (A) Miami-Dade, FL, Class 4 Hurr FL GOM BF PQ AL,<br>(B) Severity 4 CentralPressue 920.1 max wind 152.5,<br>(C) Miami-dade, FL, countyNum = 086 |
| (A) Gulf, FL, Class 2 Hurr FL CJ AL GOM GA,<br>(B) Severity 2 CentralPressue 969.2 max wind 109,8,<br>(C) Pinellas, FL, countyNum = 103 |
| (A) Broward, FL, Class 4 Hurr FL NC VA GOM MD,<br>(B) Severity 4 CentralPressue 940.4 max wind 145,<br>(C) Palm Beach, FL, countyNum = 099 |

FIG. 7

| Basis Risk: | |
|---|---|
| Basis Risk | (1,039,142) |
| Std. Dev. | 7,091,761 |
| Positive BR | 793,456 |
| Negative BR | (1,832,598) |
| Max BR* | 129,923,674 |
| Min BR* | (89,118,110) |

FIG. 8

| Layer AAL Split Bases on UNL: | | | | | | | | |
|---|---|---|---|---|---|---|---|---|
| | UNL | CWIL | CWIL Positive | Pos Bias | CWIL Negative | Neg Bias | CWIL Exact Match | Efficiency |
| Total | 26,193,150 | 23,321,410 | 793,456 | 3.03% | (1,832,598) | -7.00% | 24,360,552 | |
| Above UNL Layer | 6,000,000 | 5,943,045 | - | 0.00% | (28,478) | -0.47% | 5,971,522 | 99.05% |
| Total in UNL Layer | 20,193,150 | 17,359,294 | 774,395 | 3.83% | (1,804,120) | -8.93% | 18,389,030 | 85.97% |
| 2nd Half of UNL Layer | 5,794,306 | 5,526,584 | 234,759 | 4.05% | (251,240) | -4.34% | 5,543,066 | 95.38% |
| 1st Half of UNL Layer | 14,398,844 | 11,832,710 | 539,626 | 3.75% | (1,552,880) | -10.78% | 12,845,964 | 82.18% |
| Losses Below UNL Layer | | 19,071 | 19,071 | | | | | |

FIG. 9

CWIL Basis Risk
400m xs 10 m
Total Layer Basis Risk Statistics

| | | # Events | Expected Value | Prob. | RTP |
|---|---|---|---|---|---|
| No Basis Risk (CWIL = UNL) | | | | | |
| Full Recovery | | 15,331 | 9,201,881 | 1.53% | 43.97 |
| No Loss | | 637,197 | | 63.72% | 1.62 |
| Positive Basis Risk (CWIL > UNL) | | | | | |
| All | | 165,308 | 3,983,527 | 16.53% | 4.55 |
| Greater Than | 1,000,000 | 142,792 | 3,969,690 | 14.28% | 5.19 |
| Greater Than | 2,000,000 | 123,753 | 3,926,978 | 12.38% | 5.90 |
| Greater Than | 3,000,000 | 112,931 | 3,886,931 | 11.29% | 6.42 |
| Greater Than | 4,000,000 | 106,123 | 3,851,175 | 10.61% | 6.79 |
| Greater Than | 5,000,000 | 95,990 | 3,783,161 | 9.60% | 7.45 |
| Greater Than | 10,000,000 | 65,089 | 3,446,321 | 6.51% | 10.75 |
| Greater Than | 25,000,000 | 29,498 | 2,560,076 | 2.95% | 23.10 |
| Negative Basis Risk (CWIL < UNL) | | | | | |
| All | | 182,146 | (2,915,378) | 18.21% | 4.18 |
| Greater Than | 1,000,000 | 156,519 | (2,896,193) | 15.65% | 4.78 |
| Greater Than | 2,000,000 | 136,017 | (2,848,949) | 13.60% | 5.42 |
| Greater Than | 3,000,000 | 110,597 | (2,754,420) | 11.06% | 6.54 |
| Greater Than | 4,000,000 | 94,969 | (2,674,492) | 9.50% | 7.53 |
| Greater Than | 5,000,000 | 81,150 | (2,581,736) | 8.12% | 8.72 |
| Greater Than | 10,000,000 | 50,252 | (2,251,938) | 5.03% | 13.77 |
| Greater Than | 25,000,000 | 18,581 | (1,541,848) | 1.86% | 36.37 |
| | | Event Rate: | 1.5005 | Total Events: | 1,000,000 |

FIG. 12

| | | | Gross Loss Mean | | Layer Loss Mean | | Basis Risk | | | R Square |
|---|---|---|---|---|---|---|---|---|---|---|
| 47 | | | | | | | | | | Correlation |
| 48 | | | | | | | | | | *Numbers are only valid for... |
| 49 | | | | | | | | | | |
| 50 | | | | | | | | | | |
| 51 | | | | | | | | | | |
| 52 | | | | | | | | | | |
| 53 | Event ID | Rate | Company | CWIL | Company | CWIL | By Mean | | Weight | Description |
| 54 | 270156757 | 0.0001 | 423,507,244 | 320,881,890 | 400,000,000 | 310,881,890 | (89,118,110) | | 2500.00 | (A) N/A, Z37, Class 2 H |
| 55 | 270025187 | 0.0001 | 289,771,068 | 204,503,154 | 279,771,068 | 194,503,154 | (85,267,913) | | 4000.00 | (A) N/A, Z37, Class 0 H |
| 56 | 270059342 | 0.0001 | 175,738,162 | 95,562,950 | 165,738,162 | 85,562,950 | (80,175,212) | | 4000.00 | (A) Miami-Dade, FL, Cl |
| 57 | 270165936 | 0.0001 | 250,200,973 | 172,495,667 | 240,200,973 | 162,495,667 | (77,705,306) | | 4000.00 | (A) N/A, Z37, Class 3 H |
| 58 | 270114758 | 0.0001 | 224,762,763 | 160,170,517 | 214,762,763 | 150,170,517 | (64,592,246) | | 4000.00 | (A) Monroe, FL, Class |
| 59 | 270050111 | 0.0001 | 349,492,297 | 286,011,087 | 339,492,297 | 276,011,087 | (63,481,210) | | 2500.00 | (A) Miami-Dade, FL, Cl |
| 60 | 270142953 | 0.0001 | 221,077,640 | 158,115,962 | 211,077,640 | 148,115,962 | (62,961,679) | | 4000.00 | (A) Monroe, FL, Class |

1400, 1410, 1420, 1430, 1440, 1450, 1460, 1470, 1480, 1490

F I G. 14

| Layer AAL: | | | | | | Event | 2079126 | 2079127 | 2081106 | 2081017 |
|---|---|---|---|---|---|---|---|---|---|---|
| AAL | UNL | CWIL | | | | Rate | 1.8566E-08 | 3.97308E-07 | 1.51075E-06 | 3.17381E-08 |
| | 416,565 | 426,143 | | | | Com. Loss | 236,700,653 | 207,330,889 | 251,312,512 | 229,926,159 |
| Basis Risk | 9,578 | | | | | CWIL Loss | 199,630,804 | 179,310,725 | 223,674,831 | 204,792,486 |
| AAL from Other Model: | | | | | | BR on GR | (37,069,848) | (28,020,164) | (27,637,681) | (25,133,637) |
| | | | | | | | | | | |
| State | Lab | Fip | County | Factor | AAL | Gradient | 2079126 | 2079127 | 2081106 | 2081017 |
| Tennessee | PL+CL | 157 | Shelby | 0.13% | 65,685 | 247,649 | 76,654,611,591 | 70,373,020,217 | 96,654,276,291 | 85,439,907,436 |
| Mississippi | PL+CL | 033 | Desoto | 0.70% | 32,472 | 39,789 | 10,978,554,010 | 10,409,318,292 | 9,364,511,260 | 5,852,892,249 |
| Mississippi | PL+CL | 143 | Tunica | 0.00% | - | 18,138 | 4,026,101,582 | 3,792,253,706 | 4,087,102,148 | 1,805,630,137 |
| Arkansas | PL+CL | 035 | Crittenden | 0.00% | - | 23,724 | 1,736,440,477 | 1,534,896,697 | 2,854,443,034 | 2,035,793,014 |

FIG. 17

SYSTEM AND METHOD FOR DETERMINING LOSS DATA BASED ON INDUSTRY INDICES

BACKGROUND INFORMATION

An innovation in financial markets is the development and use of industry losses from catastrophic (CAT) events, such as hurricanes and earthquakes, as a trigger mechanism for payout of a specified amount of money to an insurance company or other insured entity. This trigger mechanism offers a potentially more cost-efficient mechanism for financing CAT losses than conventional insurance and reinsurance. Index-Linked Securities ("ILS") can be issued in various forms, including securities (e.g., CAT bonds), derivatives, or reinsurance. Insurers can use these instruments to hedge or reinsure their exposure to CAT losses. It is noted that throughout this description when the term "security" or "securities" is used it refers to the ILS instruments which may or may not be a security as that term is defined by law.

However, such instruments may not always pay an amount that equals the insured's (or reinsured's) actual loss. In the case where the instrument does not sufficiently compensate an insured (or reinsured) for its actual losses from a CAT event, this shortfall is referred to as negative basis risk. In another case where the instrument overcompensates an insured (or reinsured) relative to its actual losses from a CAT event, this overage is referred to as positive basis risk.

The reduction of basis risk is a key goal of those designing ILS instruments because the more basis risk is reduced, the more cost effective and appealing ILS instruments are as an alternative to standard reinsurance that reimburses insureds for losses on a basis directly linked to the insured's (or reinsured's) actual losses.

The index can be any of a number of commonly used industry indexes that record the industry loss of certain meteorological or seismic parameters related to a natural disaster event. However, for insurers to effectively use the hedging potential of these types of security instruments, the insurers must understand this basis risk with respect to their portfolio. Thus, an advantageous tool would present data concerning such basis risk to the potential purchaser of these types of securities. Moreover, the finer the granularity of this understanding, the more useful the tool may be to the potential buyer.

SUMMARY OF THE EXEMPLARY EMBODIMENTS

A method for calculating an element factor for each of a plurality of elements based on a modeled company loss for a plurality of events and an industry loss for the plurality of events, calculating a company loss for each element based on the element factor and an industry loss for each of the corresponding elements for each of a plurality of events, comparing the company loss for each element to the modeled company loss for each element for each of the events, wherein the comparing occurs within a layer of interest to determine a basis risk for each of the events and outputting a monetary value of the basis risk for each of the events based on each of the elements.

A system having a receiving arrangement receiving a modeled company loss for a plurality of events and an industry loss for the plurality of events, a calculating arrangement calculating an element factor for each of a plurality of elements based on the modeled company loss for the plurality of events and the industry loss for the plurality of events, the calculating element further calculating a company loss for each element based on the element factor and an industry loss for each of the corresponding elements for each of a plurality of events, a comparison arrangement comparing the company loss for each element to the modeled company loss for each element for each of the events, wherein the comparing occurs within a layer of interest to determine a basis risk for each of the events and an output arrangement outputting a monetary value of the basis risk for each of the events based on each of the elements.

BRIEF DESCRIPTION OF THE DRAWINGS

FIG. 1 shows an example of an ideal mean loss curve.

FIG. 7 shows an exemplary catalog of events and tags for the events according to the exemplary embodiments.

FIG. 8 shows an exemplary display generated by the county analysis tool showing exemplary statistics determined by the county analysis tool according to the exemplary embodiments.

FIG. 9 shows a further exemplary display generated by the county analysis tool showing a comparison of ultimate net loss (UNL) thresholds to county industry loss thresholds according to the exemplary embodiments.

FIG. 12 shows an exemplary display that splits the basis risk by size according to the exemplary embodiments.

FIG. 14 shows an event detail display for an event selected by the user according to the exemplary embodiments.

FIG. 17 shows a gradient display for the events selected by the user according to the exemplary embodiments.

DETAILED DESCRIPTION

Figure 2:
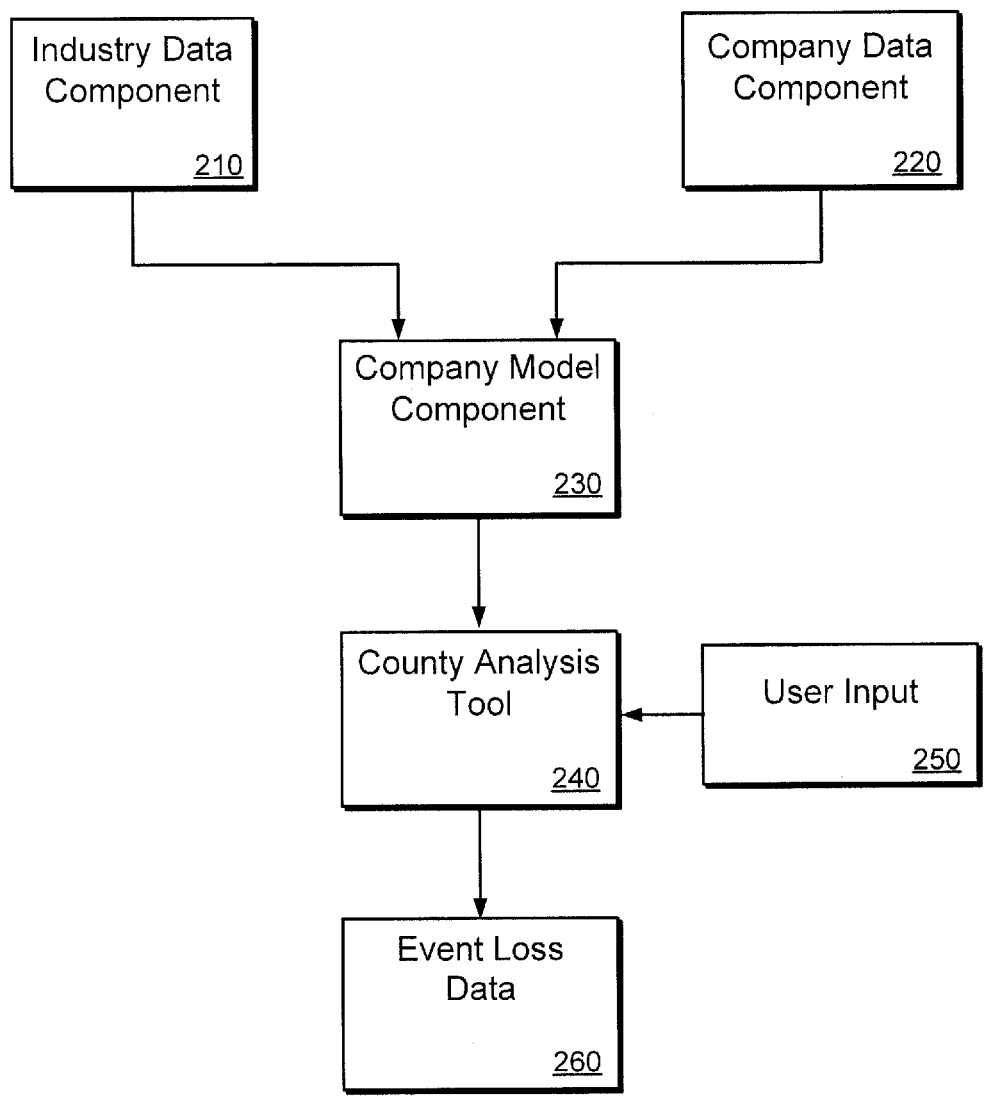
FIG. 2 shows an exemplary system including a county analysis tool for determining the basis risk according to an exemplary embodiment.

The exemplary embodiments may be further understood with reference to the following description of the exemplary embodiments and the related appended drawings, wherein like elements are provided with the same reference numerals. The exemplary embodiments are related to systems and methods for analyzing risks related to security instruments for hedging risk against catastrophic losses. Specifically, the exemplary embodiments allow a company (e.g., an insurance company) interested in purchasing such security instruments to visually compare its assumed risk to the index based risk and help determine whether the purchase of the security instrument will aid the company in meeting its hedging goals and also determine the price effectiveness of the security instrument with respect to these hedging goals. Generally, index based security instruments have a lower cost than traditional reinsurance instruments for several reasons, such as the avoidance of moral hazard in making payouts for catastrophic losses and the elimination of operational risk related to an individual insurance company. However, as described above and as will be described in greater detail below, the value offered to the buyer of the index based instruments is subject to inefficiencies because of the existence of basis risk. Thus, the exemplary embodiments address these inefficiencies in the value to the buyer of the index based instruments.

Throughout this description, the term "loss" will be used to describe an amount of expected outward cash flow to which the insuring company is exposed for one or more events. It is noted that, except where specifically described, the loss referred to in this description is not an actual loss. That is, the systems and methods of the exemplary embodiments are used by the insuring company to evaluate their risk and the advisability of purchasing security instruments (including the price of these security instruments) to hedge against these risks before an actual loss occurs. Thus, the "losses" described herein may be considered to be "modeled losses," "expected losses" or "simulated losses," e.g., losses to which the insuring company could expect to be exposed should a certain event occur based on a model of that event. These modeled losses may be applicable to a specific company or across the entire industry, e.g., multiple companies. Exemplary modeled losses will be described in greater detail below.

In addition, throughout this description, the term CWIL ("county weighted industry loss") will be used to refer to a proxy for a company loss that is based on an industry loss index, in this case a weighted average industry loss by county. It is noted that the term CWIL is a registered trademark owned by Guy Carpenter & Company, LLC. However, the exemplary embodiments are not limited to county industry loss indices, but may be applicable to any type of industry indices, either based on geographic areas (e.g., zip code, geocode, a set of counties, a defined coastal area, an area of landfall for a hurricane, etc.) or any other type of industry indices (e.g., event based indices, such as PERILS®, SIGMA®, etc.). Thus, the use of the term CWIL and CWIL loss is only for exemplary purposes to describe the general functionality provided by the exemplary systems and methods and should not be considered to be limiting in any manner.

The methods of the exemplary embodiments may be advantageously implemented using one or more computer programs executing on a computer system having a processor or central processing unit, such as, for example, a computer using an Intel-based CPU, such as a Pentium or Centrino, running an operating system such as the WINDOWS or LINUX operating systems, having non-transitory storage mediums, such as, a hard drive, RAM, ROM, a compact disc, magneto-optical storage device, and/or fixed or removable media, and having a one or more user interface devices, such as, for example, computer terminals, personal computers, laptop computers, and/or handheld devices, with an input means, such as, for example, a keyboard, mouse, pointing device, and/or microphone. The methods may also be implemented via a server executing a computer program and having users remotely access the results generated by the server for display on their personal devices, e.g., over the Internet or a company intranet.

The following is a typical structure of a CAT bond. Capital raised by issuing CAT bonds is invested in safe securities such as Treasury bonds, which are held by a single-purpose reinsurer to insulate investors from the credit risk of the bond-issuer. The bond-issuer holds a call option on the principal in the single-purpose reinsurer with triggering or strike conditions usually expressed in terms of the issuing insurer's losses from a defined CAT event. If the defined event occurs, the bond-issuer can withdraw funds from the reinsurer to pay claims, and part or all of the interest and principal payments are forgiven. If the defined CAT event does not occur, the investors receive their principal plus interest equal to the risk free rate plus a risk-premium.

Similarly, an ILW contract is a reinsurance or derivative contract through which one party will purchase protection based on the total loss arising from an event to the entire insurance industry rather than its individual loss. The amount of protection offered by the contract is referred to as the "limit." The industry loss for which the limit is paid is referred to as the "trigger." To provide a specific example of an ILW contract, an insurance company may purchase a contract having a limit of $200 million that is payable upon an industry trigger of $25 billion. That is, if an event occurs (e.g., an earthquake) where the total industry loss is $25 billion, the insurance company will receive a payment or limit of $200 million, regardless of actual losses suffered by the insurance company during the event.

One can readily see a significant issue that may arise from such instruments that are not directly related to the actual losses of the insurance company. As described above, this issue may be referred to as the "basis risk," which is the difference between the index based payoff and the buyers actual loss. To provide one troublesome scenario for the insurance company using the example ILW contract given above, an event may occur where the total industry losses are $20 billion and the actual losses to the insurance company are $500 million. In such a case, the insurance company will not receive any payment, meaning that the ILW contract had no hedging effect for this event. This may be referred to as a negative basis risk. In another scenario, the industry losses may be $30 billion, but the actual losses to the insurance company are $50 million. In such case, the insurance company will receive the $200 million limit, but it has overhedged its position and likely paid for a hedging position that it did not need. This may be referred to as a positive basis risk. The goal of the insurance company is not always to cover all its losses in an event because it expects to have some payouts from certain events, but rather to at least hedge the company's position with respect to CAT losses so as to avoid catastrophic losses by the insurer that would jeopardize its financial stability. Thus, the company has to balance its hedging position with the amount of money it pays for such hedging.

However, even with these type of issues, these type of security instruments are attractive to insurance companies because they are generally much less expensive than a traditional reinsurance arrangement, assuming that the insurance company can balance the efficiency of its industry based hedging position with the cost of the security instrument. The exemplary systems and methods will provide users with data that may be used to balance these competing interests, e.g., obtaining a security instrument that covers the most potential losses, while paying the least amount for the coverage. In addition, the exemplary systems and methods will provide data that the company may present to regulators and ratings agencies to meet its obligations regarding regulatory positions and solvency issues.

It is noted that while the exemplary embodiments are described with reference to CAT bonds and ILW contracts, this should not be considered limiting in any way. The exemplary embodiments may be used with respect to any security instrument that is based on loss indices. Moreover, the exemplary embodiments are described with reference to an insurance company hedging its CAT risk related to property damage, but other risks may also be hedged, including insurance risks (e.g., life insurance, business interruption, etc.) and non-insurance risks (e.g., accounting risks) by companies other than insurance companies. In one exemplary embodiment, the systems and methods described herein may be applied to an industry index related to the generation of electricity. For example, after a disaster where homes or business are destroyed, an electric power generating company may have a lower demand for electricity because the homes and businesses that it was expecting to generate the demand no longer exist. However, the electric power generating company still has obligations (e.g., debt service payments, plant maintenance, gas/oil/coal supply contracts, etc.). Thus, the modeling described herein for CAT risks may also be applied to such a loss of demand scenario. In another example, it may be that a mortgage lender lends in an area prone to earthquakes and since homeowners are not required to have insurance for earthquakes, it may be that after such an event, many homes securing the mortgages are destroyed. In such a case, the mortgage lender may lose certain monthly servicing fees which the mortgage lender is expecting, even for those mortgages that the lender has been able to sell on a secondary market. Again, the modeling described herein for CAT risks may also be applied to such a loss of servicing fee scenario. Based on these further examples, it should be apparent to those skilled in the art how the exemplary embodiments may be applied to these other situations.

In a situation of direct reinsurance based on an insurance company's average annual loss ("AAL") or expected loss, an analysis of the company's policies and associated data, such as geocodes, property type, construction type, etc., are input into a CAT model to generate a UNL figure for the company. This information is specific to the insurance company and is useful, but on its own, is not sufficient for the analysis of a CAT bond or ILW contract because, as described above, these types of security instruments are based on the overall industry loss for an event and not only the particular company's expected loss. Thus, a goal of the exemplary systems and method is to most closely match the company's loss based on the industry index loss to the particular company's loss based on the CAT model. In the terminology described above, to match the CWIL loss to the UNL loss.

FIG. 1 shows an example of an ideal mean loss curve for the industry loss (CWIL loss) and the particular company (UNL loss). In this example, the industry loss in dollars is shown on the Y axis, while the company loss in dollars is shown on the X axis. The straight line 100 shows the ideal curve where the company loss is directly proportional to the industry loss, e.g., there is little or no basis risk for the company. That is, if the losses were truly proportional, the company could pick an industry trigger value and they would know their expected loss for such a trigger and could pick the limit for purposes of hedging. However, the CWIL loss for the company based on the industry index may be significantly different from the modeled UNL loss for the company, meaning that the loss curve will deviate from the ideal line 100. Thus, the company desires to move this modeled CWIL loss curve as close to the ideal curve as possible to gain as much certainty as possible. As will be described in greater detail below, the exemplary system and methods allow the company to see how the modeled CWIL loss can be moved closer to the ideal loss curve.

To provide this functionality, the exemplary embodiments obtain a set of county factors such that the company's loss may be represented by a combination of industry losses of selected counties. In the exemplary embodiments, the factors are a proxy for the market share for the county. However, it is noted that the county factors are not coextensive with market share, but rather a proxy for market share. For example, if it were considered that a particular CAT event such as a hurricane could be limited to a single county, it would be expected that a straight market share analysis would yield a modeled loss curve for the event that would be essentially identical to the industry market share in the county. Specifically, if a selected insurance company (insurance company A) insured 50% of the insured property for CAT events in the county, it would be expected that insurance company A would suffer 50% of the losses if the CAT event occurred. Thus, a straight market share evaluation would result in a modeled loss that would most closely match the industry loss. However, in reality, there are many factors that may affect this analysis. For example, insurance company A may have most of its insured exposure in inland areas of the county, and in the CAT event, the coastal areas are more affected, resulting in less losses for inland areas and correspondingly, the losses of company A for such an event are less than its 50% market share would indicate in a straight market share analysis. In another example, insurance company A may insure a greater number of older structures that are more likely to suffer damage from the CAT event, resulting in higher losses for insurance company A than its 50% market share would indicate in a straight market share analysis. Thus, the exemplary embodiments, obtain county factors that are a proxy for the market share taking into account more information than merely market share to result in a modeled CWIL loss that more accurately matches the modeled UNL loss.

The solution to the problem on a county basis may be considered an optimization problem where for each event the insurance company will experience a loss in each county. It is noted that while it may be considered that each county has a loss for each event, this loss may be zero (0) for some events, (e.g., a hurricane that tracks through South Carolina, may result in a zero loss for counties in Florida). Thus, for each event, the insurance company will experience an event total loss that is a summation of the losses in each county, while the total expected loss for the company is a summation of losses in each county for all events. Correspondingly, the entire industry will experience a loss in each county for each event. Thus, for each event, the industry event loss is a summation of the industry losses in each county, while the total industry expected loss is a summation of industry losses in each county for all events. The optimization problem is to determine a set of factors that relate the county loss for the company to the county industry loss. As described above, this factor that is a solution to the optimization problem for each county is referred to as a county factor. It is noted that the county factors are "a" solution to the optimization problem and not "the" solution to the optimization problem because similar to many optimization problems, there may be many solutions and the county factor is a non-exclusive solution to the problem. Another manner of stating this optimization problem is that a summation of the product of the county factors times the industry county losses for each event should equal the total company loss. One non-exclusive manner of solving this optimization problem is to generate a constrained least square problem by organizing each of the industry county losses for each event into a matrix A and organizing the total company losses for each event into a matrix B and solving for the series of county factors (F) that meet the constraint of $Min[|(AF-B|^2]$. Again, those skilled in the art will understand that there are many ways of solving the optimization problem and the above-described manner is only exemplary because any of these potential solutions would be a valid manner of implementing the exemplary embodiments. To reiterate the purpose of this optimization problem, the set of county factors are a solution that attempts to minimize the basis risk for each county by event and/or the basis risk for the total company loss by event. Also, as stated above, the same optimization problem may be applied to other geographical areas or manner of indexing industry losses. In these other contexts, the calculated factors may be generally referred to as "element factors." That is, county factors are a subset of element factors that are related to a county analysis. In contrast, if the analysis were based on geocodes, the element factor may be referred to as a geocode factor.

FIG. 2 shows an exemplary system 200 for determining the basis risk on a county basis. In this example, a company model component 230 is a CAT model that is used by the insurance company to model its potential losses for a series of events, e.g., UNL losses. Those skilled in the art will understand that the company model component 230 may be generated in any number of manners and different companies may use different types of models. The exact type of model or modeling approach used by the company is outside the scope of the exemplary embodiments. Rather, the exemplary embodiments are interested in receiving as an input, the output of the company model component 230. Thus, in this example, the company will input company data (e.g., policy data such as insured locations, policy amounts, etc.) into company data component 220. The company data will be input into the company model component 230 and run through the selected company model to generate a list of events and the simulated company loss for each event. To provide one specific example, if an event is a hurricane, the storm may be run through a model to create simulated damage amounts. It may be considered that the hurricane made landfall in a particular state and tracked through certain counties of the state, including the characteristics of the storm. Based on the characteristics and the amount of exposure that the company has (e.g., based on the input provided by company data component 220), the company model component 230 will generate the list of events and simulated loss data for each of the events.

These events that are generated by the company model component may be based on real events that have actually occurred in the past for the county such as a previous hurricane. However, the list of events may also include modified events. For example, the real hurricane described above may have been a category 3 hurricane. The list of events may include a modified event that is a similar hurricane (e.g., the same hurricane track), but modified to a category 4 hurricane. In addition, the list of events may include completely theoretical events. For example, a particular county may have never experienced a hurricane, but event data for a hurricane having a track through the county may be included in the list of events. This list of events and the company exposure (simulated loss) for each of these events are then used as input in a county analysis tool 240.

Similarly, the company model component 230 also receives input from an industry data component 210 that includes the same type of information included in the company data component 220, except the information is for the entire industry. The company model component 230 will then generate the simulated industry loss for each of the events based on the counties affected by the event. Thus, the company data from the company data component 220 and the industry data from the industry data component 210 are processed through the same CAT model in the company model component 230. As described above, each insurance company may use any CAT model in company model component 230 of their choosing. The county analysis tool 240 then receives simulated loss data for a series of events (e.g., hurricanes, earthquakes, etc.) based on an individual company and for the entire industry that are output by the company model component 230.

The county analysis tool 240 may tag each of these events with certain types of data for use in the analysis. Continuing with the example of a hurricane, the county analysis tool 240 may tag each hurricane event with data such as landfall and storm class. These tags may also include derived data such as the county with the largest loss. Since the event models include the losses for every county and every event, this data may be used to generate the derived data, e.g., the county with the biggest loss. These tagging details allow the county analysis tool 240 to analyze basis risk by county, and to explicitly adjust county factors taking into account likely storm paths and potential subsidization effects between neighboring counties. Subsidization effects refer to the situation where there is an offsetting amount of positive basis risk and negative basis risk. For example, if one county has a positive basis risk of $10 million, while a neighboring county has a negative basis risk of $10 million, the total basis risk will be $0. However, those of skill in the art will understand that the total basis risk of $0 in this example is not an accurate assessment of the basis risk. The subsidization effect has falsely changed a substantial basis risk into what appears to be no basis risk.

FIG. 7 shows an exemplary list of events 700 and tags for the events. Referring to row 710 of the list of events 700 shows some exemplary tags that may be applied to an event. In this case, the event is tagged as including the county of first landfall (Sarasota, Fla.), the storm details (Severity 2, Central Pressure 934.6, Max Wind 108.3) and county of maximum loss (Lee, Fla., County Num=071). As will be described in greater detail below, the tagging of the events allows for the detailed identification of the drivers of basis risk. For example, the geographic tagging allows the aggregation and categorization of basis risk based on geography. Using this information, a user of the system may determine if, for example, one county is a large driver of basis risk. To provide a specific example, using the event tags, a user may search for all events that meet a tag characteristic (e.g., county=Sarasota, Fla.) to identify all events that fall within that county. The user may then determine if these events reveal a specific imbalance in the basis risk such as the county exhibiting an outsized basis risk compared to other counties, the county having a specific subsidization effect as described above, etc. Likewise, other types of non-geographic tagging such as the storm details can be used either alone, or in conjunction with the geographic tagging to allow a similar categorization and aggregation of basis risk.

Referring back to the system 200 of FIG. 2, the county analysis tool 240 may then be used to solve the optimization problem defined above using the data input from the simulated industry loss component 210 and the company model component 230 to produce event loss data 260. As explained above, the optimization problem is directed at generating a proxy for expected company loss (e.g., CWIL loss) that is based on the industry loss index for each event. That is, in the ideal situation, the county analysis tool 240 will use the input data to create a proxy for expected company loss (e.g., CWIL loss) that is identical to the loss that is produced by the company model component 230 for each event (e.g., UNL loss). This event loss data 260 may be displayed to the user via a display device (e.g., monitor, printer, etc.) so the user may see the event loss data 260 along with other types of statistical data based on the analysis performed by the county analysis tool 240. Examples of loss curves and other displays are provided below.

However, in most, if not all situations, the CWIL loss will not exactly match the modeled UNL loss, thereby resulting in basis risk to the company. Thus, as will be described in greater detail below, the county analysis tool 240 may be used to manipulate the data in order to, for example, reduce this basis risk, quantify the cost required to reduce the basis risk, identify the magnitude of the risk associated with the basis risk, etc. Therefore, in addition to the other inputs described above, the county analysis tool 240 may also receive user input 250 to perform this manipulation to more closely match the CWIL loss to the UNL loss. As will be described in greater detail below, there are two general manners of user input manipulating the data within the system 200 to perform the above identified functionalities. In one manner, the user input may include, for example, weighting information that is used to perform the county analysis. A second exemplary manner of providing user input to manipulate the data is to change the county factors after they have been determined by the county analysis tool 240. Both of these general manners of manipulating the data to attempt to more closely match the CWIL loss to the UNL loss will be described in greater detail below.

Figure 3:
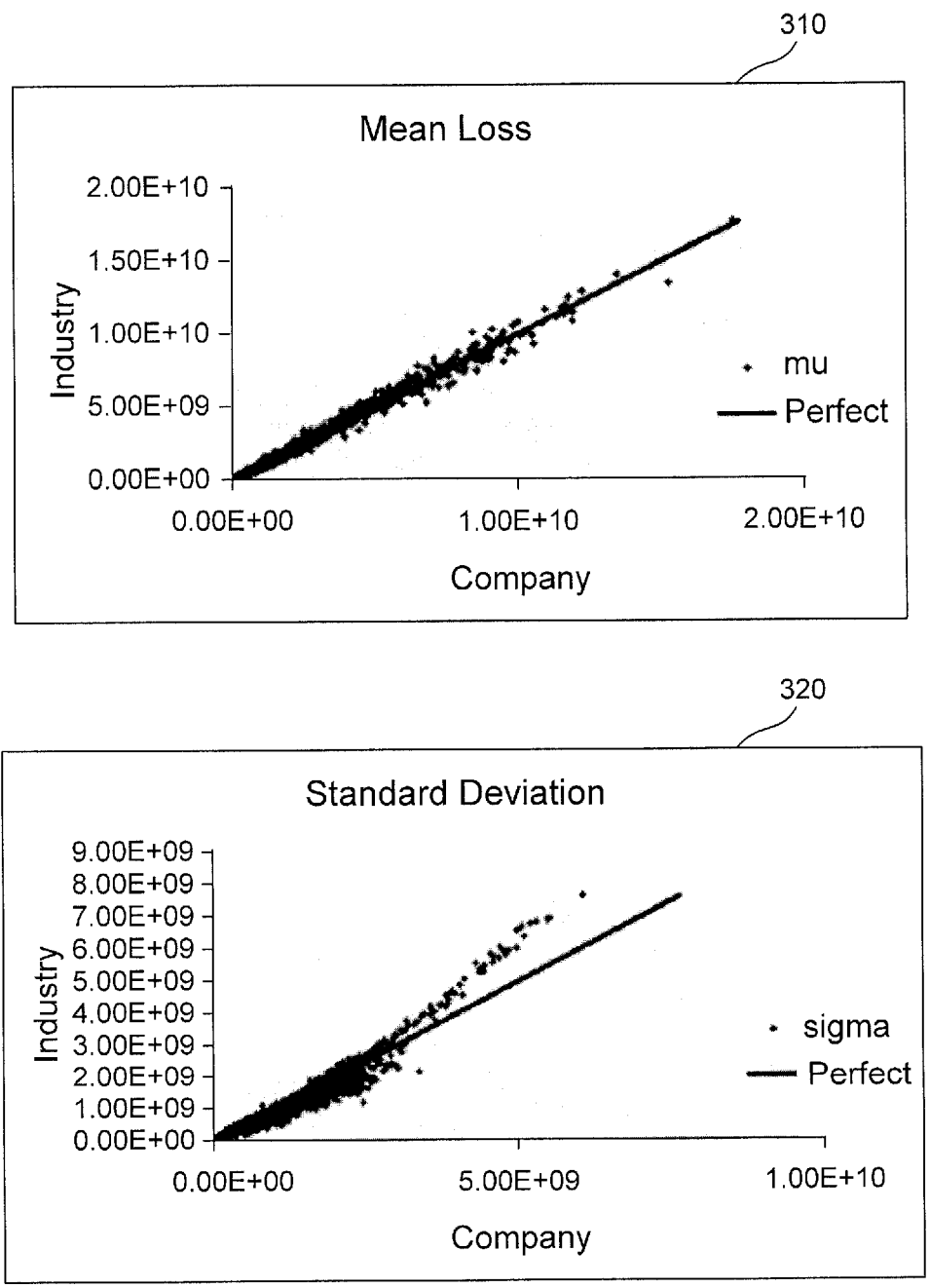
FIG. 3 shows two exemplary curves for event loss data that may be generated by the county analysis tool according to an exemplary embodiment.

FIG. 3 shows two exemplary loss curves 310 and 320 for event loss data 260 that may be generated by the county analysis tool 240. Each of the loss curves 310 and 320 show the ideal curve as described above with respect to FIG. 1. However, the loss curves 310 and 320 also show actual data points for the events that are generated by the county analysis tool 240. In this example, the loss curve 310 shows the mean loss for each event. As can be seen from this example, there are many data points corresponding to events that are mapped for this county analysis. In the sample runs of an exemplary county analysis tool 240, the loss curve 310 was generated based on 18,000 events in 2,300 counties. As described above, the modeled event loss data 260 will vary from the ideal loss curve as shown by these examples.

In contrast, the loss curve 320 shows the standard deviation parameters for each of the events in the county analysis. The difference between the loss curves 310 and 320 is that the loss curve 310 is generated using only the primary uncertainty, while the loss curve 320 is generated using the parameter to account for the secondary uncertainty. The same optimization problem may be resolved using the parameter accounting for secondary uncertainty that would generally result in double the event records and result in the standard deviation curve 320. In the present context, primary uncertainty may be considered whether an event occurred and what event occurred. In contrast, secondary uncertainty may be considered to be the size of the event. The optimization problem may be adjusted to generate the standard deviation curve 320 that also includes the secondary uncertainty. Thus, from these examples it can be seen that the system 200 may provide the user with the ability to fit the loss curves to either the mean loss or the standard deviation parameter simultaneously.

In general, throughout this description, the mean loss will be used for illustrative purposes. However, those skilled in the art will understand that all the functionality that is described herein as being associated with the mean loss, may apply equally to the standard deviation parameter. For example, there may be many county factors that result in the same mean loss. However, by using the standard deviation parameter, there may be a smaller set of county factors that result in the same mean loss and standard deviation parameter. Thus, a user may desire to operate considering both the mean and standard deviation parameters rather than just the mean loss parameter alone.

The curves 310 and 320 of FIG. 3 may not provide enough detailed information for the company to evaluate the effectiveness of the security instrument (e.g., hedging effects, pricing, etc.). As can be seen from the loss curves 310 and 320, the entire spectrum of losses are covered by the loss curves 310 and 320, e.g., from 0 to the maximum amount. When a company is deciding to hedge its losses, it may be interested in only covering a certain layer of losses within the loss curve. For example, to hedge against losses on the lower end of the spectrum (e.g., approaching zero), the cost of the hedging security may be prohibitively expensive and not worth analyzing. On the other hand, hedging against losses on the higher end of the spectrum (e.g., approaching the maximum amount) may also not be cost effective because of the low likelihood of occurrence. Thus, the company may define a particular loss layer in which it is interested for the security instrument to hedge against its losses.

Figure 4:
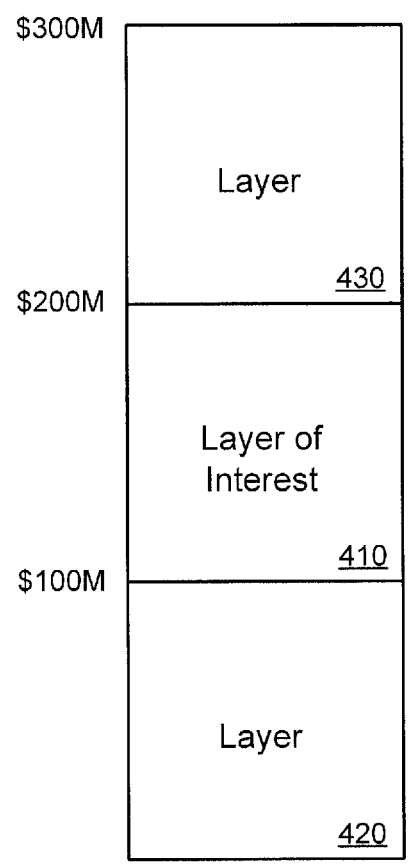
FIG. 4 shows an exemplary loss layer model indicating a layer of interest according to an exemplary embodiment.

FIG. 4 shows an exemplary loss layer model 400 indicating a layer of interest 410. In this example, loss values from $0 through $300 million are shown in the loss layer model 400. As shown the company has set a layer of interest 410 between $100 million and $200 million, i.e., as described above, the company is not interested in hedging against expected losses from $0-$100 million (layer 420) and losses over $200 million (layer 430). Those skilled in the art will understand that the layer of interest 410 is only exemplary and that a company may set the layer of interest at any desired level. In addition, it may be possible to have multiple layers within the loss curve, with each of these layers having a varying degree of interest to the company. As will be described in greater detail below, the layers of interest may be weighted and different layers of interest (or non-interest) may be weighted as needed.

To focus the analysis on the events that fall within the layer of interest 410, a weighting system may be used. As shown in the exemplary loss curves 310 and 320, each event has several possible outcomes with respect to the layer of interest 410. For example, the mean loss may be above, below or in the layer of interest 410. However, a particular event that has a mean loss outside the layer of interest 410 (e.g., falls into the layers 420 and 430 that are not of interest) may, with standard deviation, have a portion of the distribution of the loss that falls within the layer of interest 410. For example, an event that has a mean loss of less than $100 million (layer 420) may have a large standard deviation that pushes a portion of the event into the layer of interest 410. Thus, in general, the weighting system is designed to provide the highest weight to those events with mean losses that fall within the layer of interest 410. The lowest weight (which may be zero weight) is provided to those events with mean losses with a standard deviation parameter that causers the distribution of the loss to fall outside the layer of interest 410. While those events that have a mean loss outside the layer of interest 410, but have a portion of the distribution that falls into the layer of interest 410 with standard deviation, may have a weight between the highest and lowest weight events as described above. In general, this may be described as resulting from the fact that the CAT model will provide both a mean loss and a standard deviation parameter meaning that each event does not result in a single defined expected loss, but a distribution of losses. Therefore, using only the mean is not sufficient because of the uncertainty about the mean. Therefore, the weighting may account for the relative contribution to the layer of interest 410 for the distribution of each event. As will be described in greater detail below, this weighting may be variable within these general groups based on the portion of the distribution that falls within the layer of interest 410.

Figure 5:
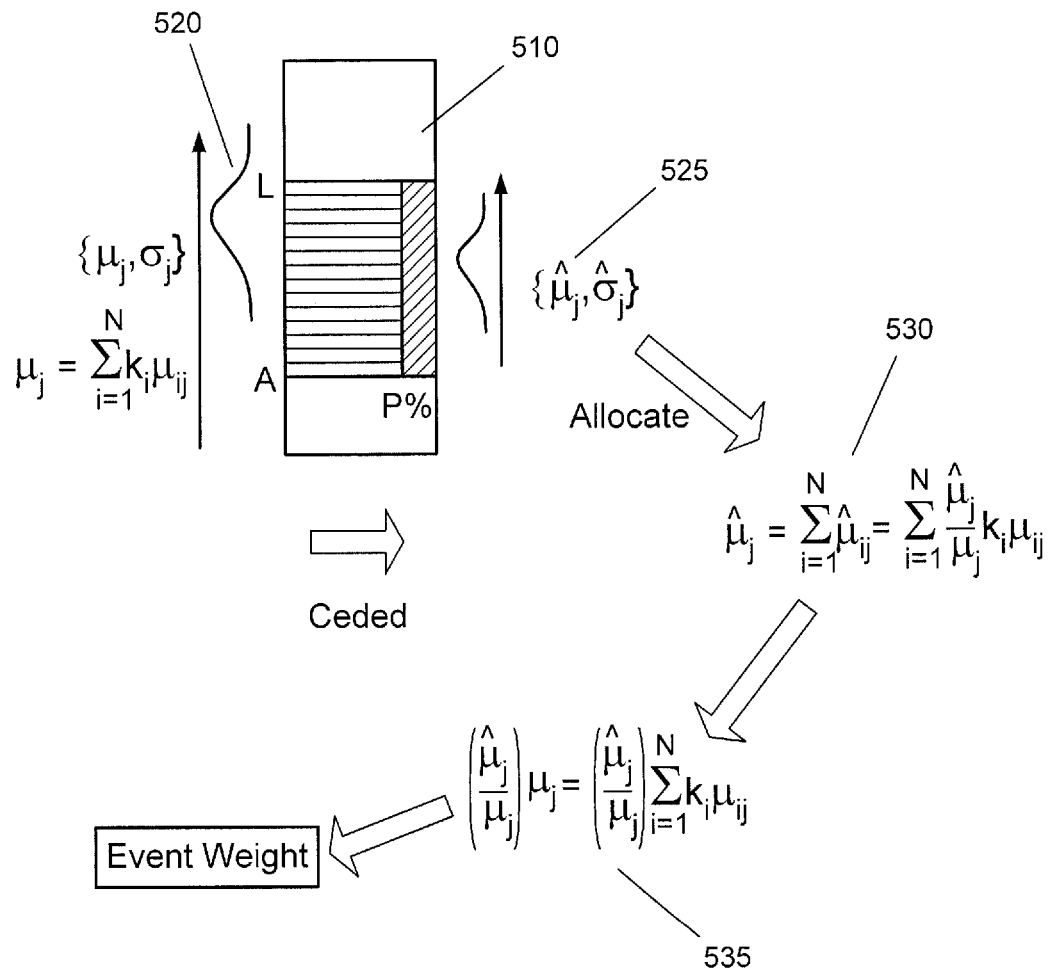
FIG. 5 shows an example of the mathematical basis of assigning weights to the loss events according to an exemplary embodiment.

FIG. 5 shows an example of the mathematical basis of assigning weights to the loss events. However, prior to providing the mathematical example of providing weights to events, the purpose of the weighting is to attempt to match the CWIL layer loss to the UNL layer loss instead of the entire gross loss. That is, while the gross loss is important, the insurance company is more concerned with the losses that will hit the layer of interest 410 because these are the losses that the insurance company is attempting to hedge and/or securitize. Thus, the purpose of the weighting is to most accurately describe those events that will cause a loss within the layer. Referring back to FIG. 5, the figure shows a loss layer model 510 having a layer of interest from point A to point L. For the purposes of this example, it will be considered that the value of A is $1B (one billion) and the value of L is $2B, meaning that the layer of interest starts at $1B and is equal to $1B. Then, as shown, each event j has a mean loss ($\mu_j$) and a standard deviation ($\sigma_j$). As described previously, the mean loss is based on the model for the event. In this example, the mean loss ($\mu_j$) is determined by summing all the losses associated with the event for each county using the county factor ($k_i$) for the event. These values may be used as input to parameterize a specific distribution which is represented by the example distribution curve 520, thereby resulting in the predicted values based on the distribution represented by the mean loss and standard deviation hat values 525. In this particular example, the distribution curve is a Beta distribution. However, the exemplary embodiments are not limited to any particular type of distribution curve. The weight value of each event may then be determined using the equations 530 and 535.

As can be seen from the equations of FIG. 5, the event weights are based on the relative value of each event to the layer of interest. The contribution of each event to the layer loss is determined and then the weight is based on that contribution. The initial weights may be user assigned or the county analysis tool 240 may include built-in weights that may be used to start the analysis. For example, the county analysis tool 240 may include default weights that are based on trigger amounts, based on the size of the layer of interest (e.g., in absolute dollars), based on the size of the layer relative to the size of the loss curve not included in the layer, based on the position of the layer of interest in the loss curve, etc. To provide a specific example using the values of $1B/XS of $1B of FIG. 5, it may be that losses that are greater than $5B may be initially assigned a weight of 0 (zero) because there is very little chance that the loss will be less than $2B. The events that produce mean losses within the layer of interest may be initially assigned the highest weights. However, there may be events having a mean loss outside the layer that are still very interesting because factoring in secondary uncertainty via the standard deviation parameter may place a portion of the event within the layer. For example, the mean loss for the event may be $900 million with a standard deviation of $200 million. Thus, there is a portion of the event distribution that will result in a layer loss, and therefore, this may warrant a more significant weight than a similar $900 million loss that has a standard deviation of $75 million for obvious reasons. However, in general, the weighting or emphasis will lessen as the mean loss moves farther from the layer of interest.

It is noted that in FIG. 5, the layer of interest is shown as having two shaded portions, darker up to a percentage (P %) and then lighter thereafter. This is merely used to indicate that while it has been considered up to this point that the insurance company is selling (ceding) the entirety of the loss within the layer of interest, this is not an absolute requirement. For example, the insurance company may only cede a certain percentage (e.g., 80%) of the loss within the layer of interest. As described above, the security instrument has a cost to the insurance company and by keeping a certain amount risk within the layer of interest, the insurance company may lower the cost of the security instrument.

The first analysis may be run using these included weights to generate the loss curves as shown below in FIG. 6 and generate the exemplary statistics as shown below in FIGS. 8-12 along with any other information desired by the user. After the user has reviewed the data, the user may then manually adjust the weights, factors and other constraints to run further iterations of the analysis using the county analysis tool 240.

Figure 6:
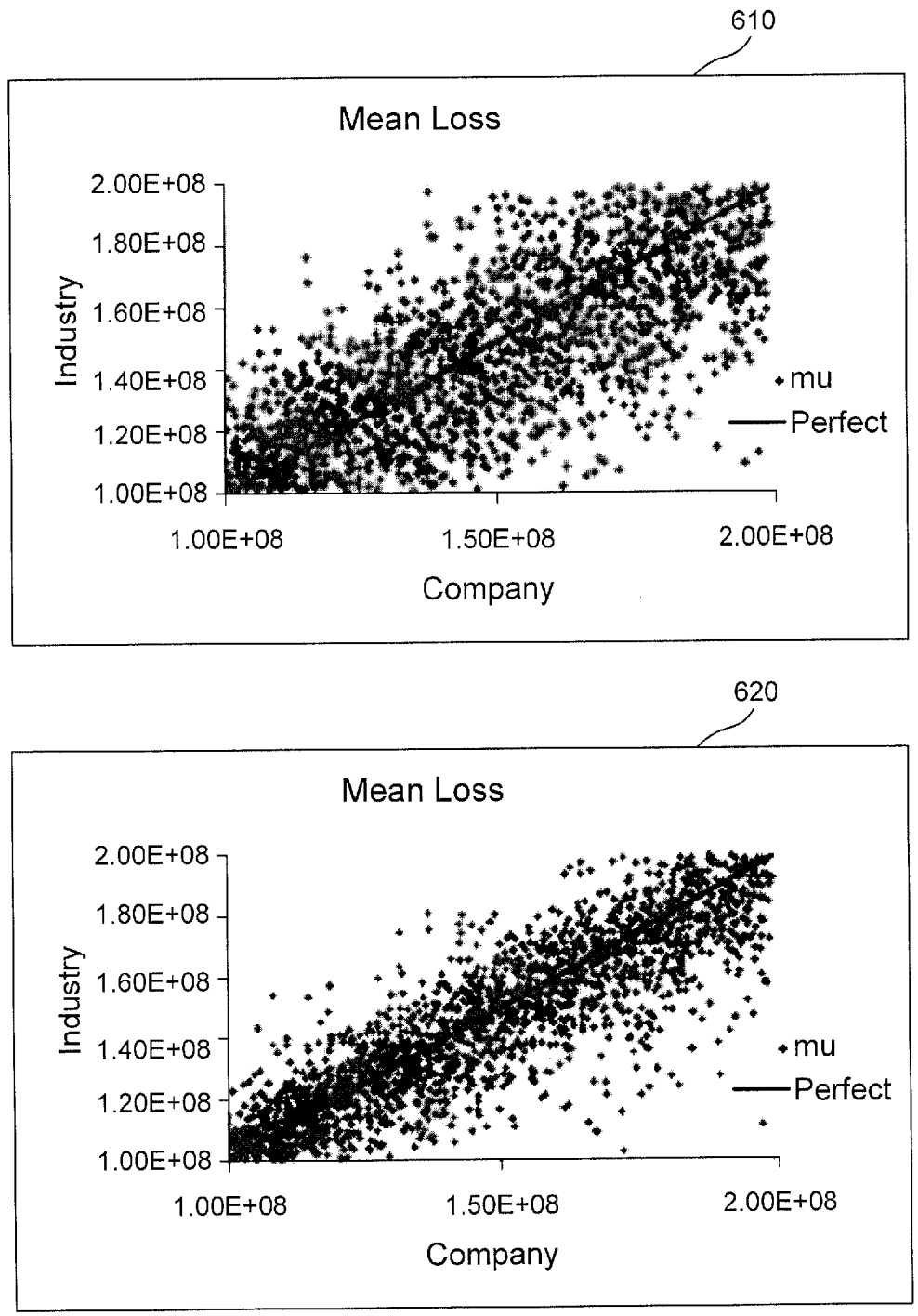
FIG. 6 shows an exemplary unweighted loss curves and an exemplary weighted loss curve within the layer of interest according to an exemplary embodiment.

FIG. 6 shows an exemplary unweighted loss curve 610 and an exemplary weighted loss curve 620 within the layer of interest. As can be seen, each of the loss curves 610 and 620 shows the values from $100 million to $200 million which is the exemplary layer of interest 410 from FIG. 4. The unweighted loss curve 610 exhibits a greater variation from the ideal loss curve than the weighted loss curve 620. Each loss curve 610 and 620 was generated using the same event data, but the weighting described above with respect to FIG. 5 was applied to the data to generate the loss curve 620. Thus, the weighting results in a more well-defined loss curve 620 that can be used by the company to evaluate the security instrument.

As described above, the weighting may be applied in an iterative manner to create the best fit to the ideal loss curve. Thus, the exemplary embodiments provide a user with various measures and statistics to be used to enhance the analysis. For example, statistics may include expected basis risk amounts split between Total, Positive and Negative. This statistic provides a measure of the distribution of the basis risk, which provides a guide to further improve the fit of the CWIL loss to the UNL loss either by giving greater weight to the negative or positive basis risk events as needed. Another statistic may be the number of Positive/Negative Basis Risk events and layer total misses. Similarly, these count statistics are a means to incorporating the distribution of basis risk events into the analysis, to make further improvements to enhance the fit.

The user also has the ability to adjust a "current weight x event rate" weighting option that can be applied at any time. This feature allows the user to explicitly factor in the probability of an event occurring. The user can then reduce the 'effective weight' given to an extremely unlikely event by building in the event's rate into the weight. In a further exemplary embodiment, the event weights may be adjusted by layer of loss or by basis risk. For example, adjustments to event weights can be made in batches by ranges, based on either UNL bands or basis risk bands. This greatly reduces the time needed to create analyses, make changes and improve fits for specific layers. Thus, a user, instead of adjusting the weight for a single event, may adjust the weight for a range of events and determine the effect on the loss curve.

FIGS. 8-12 show exemplary displays that may be generated by the county analysis tool 240 to show various aspects of the event loss data 260 calculated by the county analysis tool 240. These displays are only meant to be exemplary, as there may be any number of ways to display the event loss data 260 and there may be additional data generated by the county analysis tool 240 that is not shown in these example displays. However, the exemplary displays are used to illustrate the functionality of the displays to help a user visualize the data and information that the county analysis tool 240 is providing to the user. This visualization may provide the user with a more intuitive depiction of the basis risk and how the data may be manipulated to provide a better output from the county analysis tool 240. Again, as described repeatedly throughout this description, a better output generally refers to the CWIL loss most closely matching the UNL loss. However, the displays may also show the user the cost associated with more closely matching the CWIL loss to the UNL loss. Thus, in some instances, the user may decide that the cost of moving the CWIL loss to be closer to the UNL loss is not worth the increased price of the security instrument that such movement requires. That is, the user may decide to accept a certain amount of basis risk in the CWIL loss in order to save money on the purchase price of the security instrument. Thus, the exemplary displays illustrated in FIGS. 8-12 will aid the user in making such decisions and varying the analysis to balance cost and risk. This may be generalized to the proposition that the displays will show various problems or aspects of the CWIL loss that may need to be adjusted to more closely match the UNL loss. The user may then decide whether to fix such problems, e.g., by changing the weighting, changing the county factors, etc.

FIG. 8 shows an exemplary display 800 generated by the county analysis tool 240 showing the exemplary statistics described above. In the first column 810, the categories of basis risk are shown. These categories include total basis risk, the standard deviation, the positive basis risk, the negative basis risk, the maximum basis risk and the minimum basis risk. The second columns 820 show the values for each of the categories of basis risk. These statistics provide a measure of the distribution of the basis risk that provides a guide to further improve the fit either by giving greater weight to the negative or positive basis risk as needed.

FIG. 9 shows a further exemplary display 900 generated by the county analysis tool 240 showing a comparison of UNL thresholds to CWIL thresholds. The column 910 shows examples of categories of the thresholds that may be displayed by display 900. In this example, the categories include the total loss, the loss above the UNL layer, the loss in the UNL layer, the loss in the second half of the UNL layer, the loss in the first half of the UNL layer and the losses below the UNL layer. It should be understood that the categories shown in FIG. 9 are only exemplary and other categories may be displayed based on the preferences of the individual users. For example, the layer of interest may be divided in different manners, e.g., divided into 3, 4 . . . n sub-layers.

The column 920 shows the company UNL thresholds in dollar values for each of the categories of column 910. The column 930 shows the CWIL thresholds for the company based on the county wide industry analysis described above. As can be seen from this example, the UNL loss in the layer of interest is $20,193,150, while the CWIL loss in the layer of interest is $17,359,294. Thus, this display 900 is showing that, in the layer of interest, the calculation performed by the county analysis tool 240 to generate the CWIL loss results in a loss that is $2,833,856 ($20,193,150–$17,359,294) different from the CAT model UNL layer loss. However, the county analysis tool 240 further provides additional data to aid the user in understanding this difference and its effect on the company. Thus, the column 940 indicates the amount of positive basis risk within each of the categories and the column 950 shows the bias of that positive basis risk versus the UNL loss in each of these categories. In this example, the positive basis risk within the layer of interest is $774,385, resulting in a positive basis risk bias of 3.83% ($774,385/$20,193,150). As described above, positive basis risk is the situation where the insurance company will receive a payment from the index based security instrument when the insurance company did not experience a sufficiently large corresponding loss compared to the industry loss from the same event, meaning that the insurance company will be paying for hedging that it does not need. By looking at the columns 940 and 950, the insurance company evaluating this product can easily see the magnitude and corresponding percentage bias associated with the positive basis risk in the layer as provided in the example, or within various subgroups of the layer (e.g., the first half of the layer, the second half of the layer, etc.).

Similarly, the column 960 indicates the amount of negative basis risk within each of the categories and the column 970 shows the bias of that negative basis risk versus the UNL loss in each of these categories. Continuing with the example of the layer of interest, the negative basis risk within the layer of interest is –$1,804,120, resulting in a negative basis risk bias of –8.93% (–$1,804,120/$20,193,150). As also described above, negative basis risk is the situation where the insurance company will not receive a payment from the index based security instrument when the insurance company experienced a loss, but the industry did not experience a sufficiently large loss in the counties affecting the index in that event, meaning that the insurance company will not be effectively hedging for such risks. By looking at the columns 960 and 970, the insurance company evaluating this product can easily see the magnitude and corresponding percentage bias associated with the negative basis risk in the layer as provided in the example, or within various subgroups of the layer (e.g., the first half of the layer, the second half of the layer, etc. Thus, at a glance, a user can see that the negative basis risk in the layer of interest is more than double the positive basis risk in the layer. The user may determine that such a negative basis risk is unacceptable and may therefore re-perform the analysis by adjusting the weights, factors and/or other constraints.

The column 980 shows the CWIL exact match for each of the categories. In general, the CWIL exact match is the situation where there is zero (0) basis risk, e.g., the insurance company receives exactly the hedging effect it desires without paying for more hedging than it needs or receiving less than for which it bargained. In this example, the CWIL exact match is defined as the UNL loss for the category minus the negative basis risk for the category. Thus, in the layer of interest, the CWIL exact match is $18,389,030 ($20,193,150–$1,804,120). Those skilled in the art will understand that the CWIL exact match may be defined in another manner or a different type of measure may be defined to illustrate a different comparison. In this example, the CWIL exact match identifies the difference between the UNL loss and the negative basis risk. This measure allows the user to understand the type of negative risk that the company is taking on by purchasing the industry based security instrument rather than the direct reinsurance security instrument. However, it is just as valid to define a measure that identifies the difference between the UNL loss and an aggregate of the negative basis risk and positive basis risk or the difference between the UNL loss and the absolute value of the negative and positive basis risk as each of these measures may have a particular usefulness to an individual user.

Finally, the last column 990 shows the efficiency for each of the categories. Again, in this example, the efficiency is defined as the CWIL loss divided by the UNL loss for the category. Finishing the example of the layer of interest, the efficiency is 85.97% ($17,359,294/$20,193,150). As described above, the ideal case is where the modeled CWIL loss is identical to the modeled UNL loss. Thus, if the efficiency is 100%, the company would have a perfect match between the modeled CWIL loss and modeled UNL loss, e.g., the company would recover all its losses in the layer if an event were to occur. However, as described repeatedly throughout this description, the ideal case is very unlikely to occur. Thus, a user may evaluate the efficiency to determine the risk/reward of relying on the security instrument to hedge against losses associated with the modeled events.

It should be readily apparent to those skilled in the art that the data presented by display 900 may provide all types of useful information to a user of the system 200. For example, the user may see that the efficiency in the layer of interest is 85.97%. The user may not consider this to be very efficient. However, further inspection of the column 990 shows that the efficiency in the second half of the layer is 95.38% while the efficiency in the first half of the layer is 82.18%. This means that the first half of the layer is the truly inefficient portion of the CWIL loss. The data further confirms this inefficiency in the first half of the layer because the amount of the negative basis risk (−$1,552,880) in this first half of the layer is significantly higher than the amount of negative basis risk ($251,240) in the second half of the layer. Furthermore, it can also be seen that the amount of positive basis risk ($539,626) in the first half of the layer is significantly higher than the amount positive basis risk ($234,759) in the second half of the layer. Thus, multiple views of the data in the display 900 would indicate to the user that there may be a problem with the first half of the layer of interest. The user may then perform various operations on the weights, factors and/or other constraints to fix this inefficiency in the first half of the layer to provide for the maximization of the efficiency during the fitting process. As described above, one example of an operation that may be performed by the user is adjusting layer weights and giving consideration to how the fit performs by layer. Other examples of operations to change the efficiency will be described below.

The county analysis tool 240 also includes a convergence monitoring function that monitors the optimization of the loss curves and may stop the analysis at a point where there is a desired amount of convergence, e.g., the curve fit between the modeled CWIL loss and the modeled company loss is sufficient to meet the goals of the user. For example, the first iteration of the modeled CWIL loss curve generated using the initial weighting provided by the county analysis tool 240 may result in a first company modeled loss curve (e.g., CWIL loss vs. UNL loss). After some changes to weights, factors and/or other constraints in the manners described herein, a second iteration of the analysis may provide a second CWIL loss curve. Any improvement from the first curve to the second curve may be measured using any type of statistical measurement. As described above with reference to the optimization problem, in one exemplary embodiment, the improvement may be measured by the minimization of the function $Min[|(AF-B|_2]$. This amount of improvement from the first iteration to the second iteration may be compared to a threshold to determine if further refinement is warranted. This process may continue through multiple iterations. When an iteration is reached where the improvement is less than the threshold, the convergence monitoring function may indicate that further iterations are not necessary because they will yield little additional improvement.

As described above, while the exemplary embodiments are described with reference to the geographical area of a county, the exemplary embodiments may be applied to other geographical areas. For example, users may group counties to produce regional factors rather than county level factors. This feature may allow users to assign identical factors to multiple counties and to tailor the fit to a company's needs e.g. based on exposure considerations.

Figure 10:
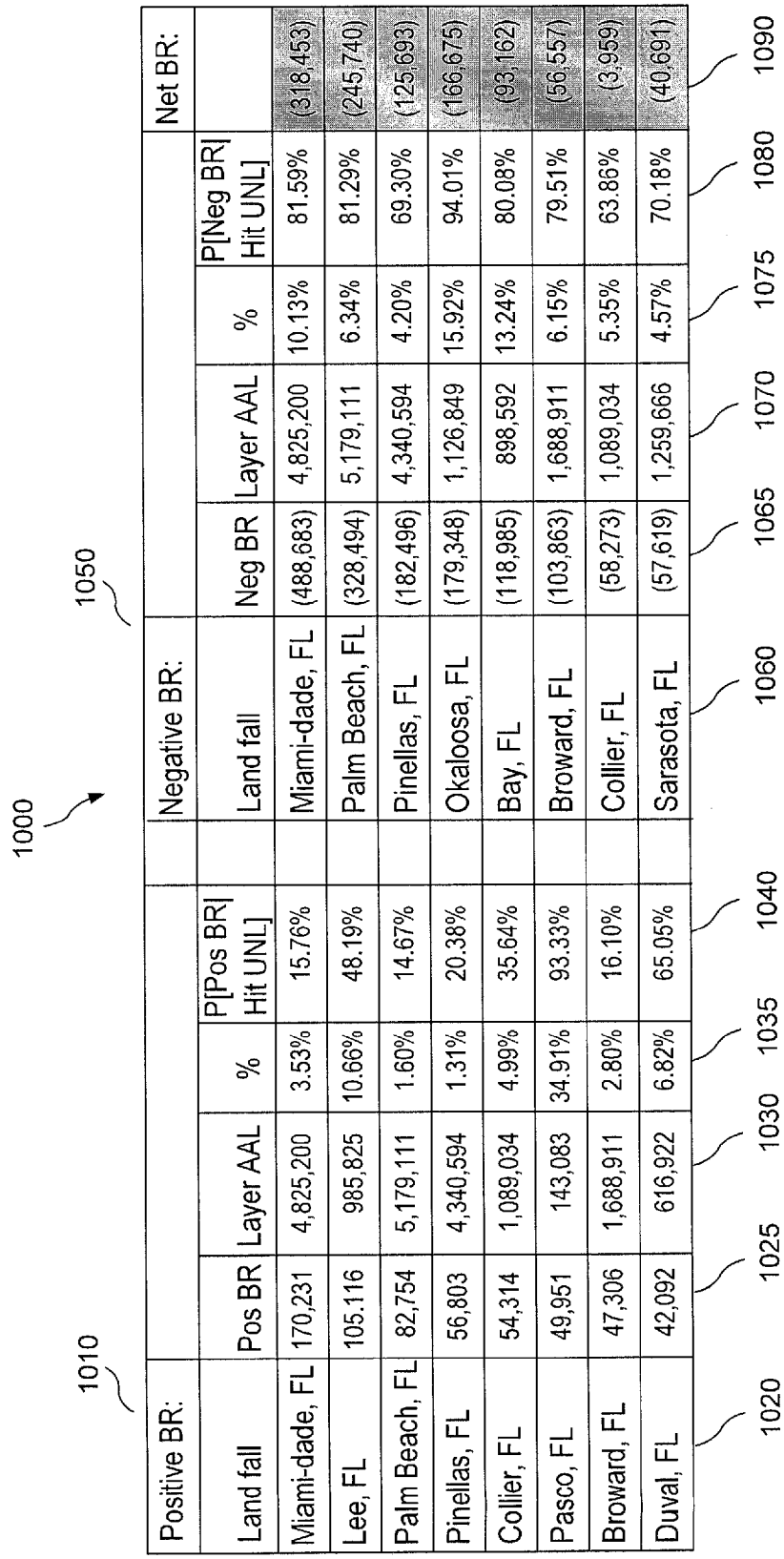
FIG. 10 shows an exemplary display generated by the county analysis tool that shows the basis risk by county for all events according to the exemplary embodiments.

FIG. 10 shows an exemplary display 1000 generated by the county analysis tool 240 that shows the basis risk by county for all events. As shown, the display 1000 is generally split into a positive basis risk view 1010 and a negative basis risk view 1050. In this particular exemplary display 1000, the basis risk is shown as based on county of landfall of a storm as shown by the column 1020 (positive) and the column 1060 (negative). As described above, each event will be tagged with various characteristics by the county analysis tool 240. Thus, when a particular event is selected, data for the event may be filtered or aggregated based on any of these tags. In this example, the county of landfall has been selected, but any of the other types of tags could also have been selected. The columns 1025 and 1065 show the amount of the positive and negative basis risk by county, respectively. As should be readily apparent from the display 1000, the counties are filtered based on basis risk from highest to lowest (e.g., Miami-Dade county with positive basis risk of $170,231 is first while Duval county with a positive basis risk of $42,092 is last). However, the counties may be filtered and displayed using another method.

The columns 1030 and 1070 show the expected layer UNL loss for all events for the listed county (Layer AAL), e.g., for Miami-Dade county the expected UNL layer loss for all events is 4,825,200 and this is shown in both the listing for Miami-Dade county in column 1030 and column 1070. The columns 1035 and 1075 show the percentage of the positive and negative basis risk, respectively. The percentage of the basis risk is determined by dividing the basis risk by the expected UNL layer loss (Layer AAL). For example, the positive basis risk in Miami-Dade county is 3.53% ($170,231/$4,825,200). The columns 1040 and 1080 show the conditional probability that the events hit the UNL with positive basis risk and negative basis risk, respectively. For example, the probability of a positive basis risk event given that it hits UNL loss events tagged as Miami-Dade county is 15.76% and the probability of a negative basis risk event given that it hits UNL loss events tagged as Miami-Dade county is 81.59%. These values do not add up to 100% because it is possible that there are events with zero basis risk. Finally, the column 1090 shows the net basis risk for the county. For example, in Miami-Dade county that is first in both positive and negative basis risk, the net basis risk is −$318,453 ($170,231-$488,683).

As described above, this display 1000 may be displayed for each of the events and this broad overview of the events allows modifications to the factors taking into consideration specific county information (e.g., company exposure by county) to further minimize potential basis risk and produce more accurate factors. In addition, the issue of subsidization was described above. This display 1000 is a simple manner of showing potential subsidization effects across different counties for different events.

Figure 11:
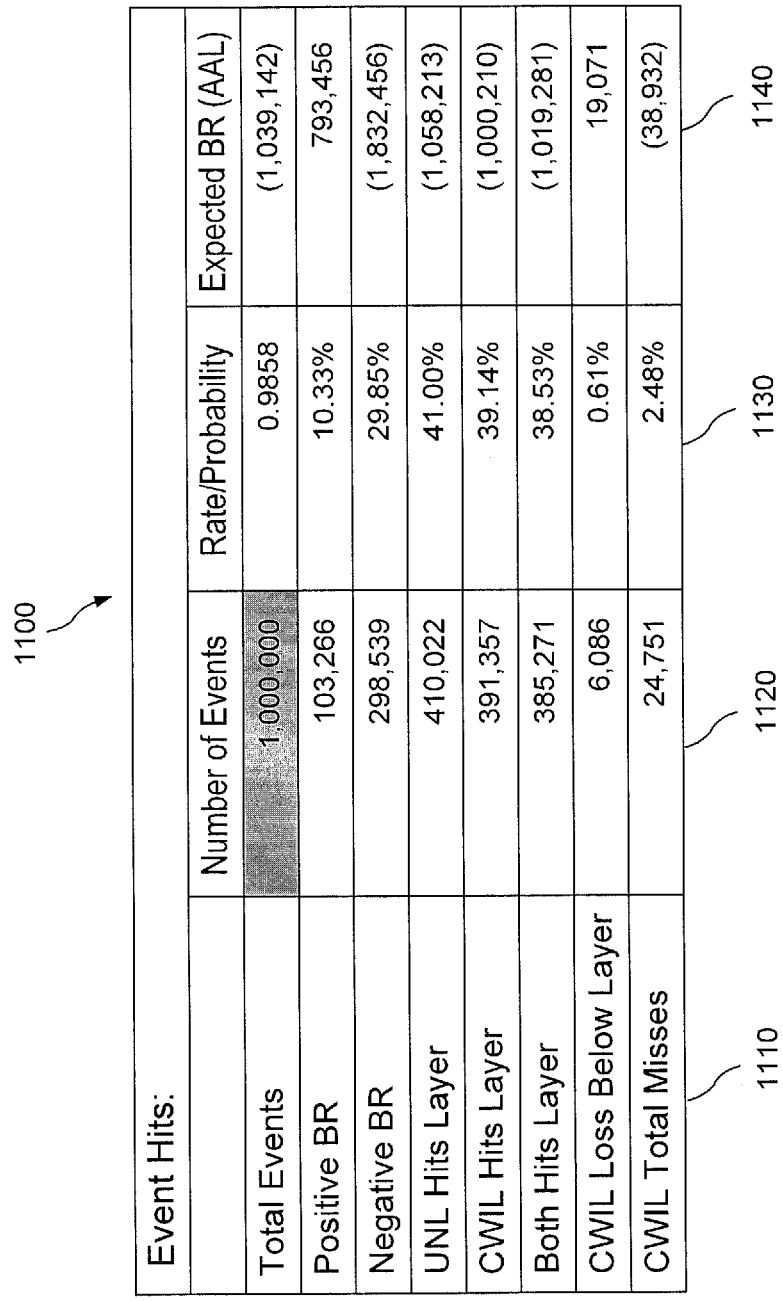
FIG. 11 shows an exemplary display generated by the county analysis tool that shows the events and the probabilities associated with the events.

FIG. 11 shows an exemplary display 1100 generated by the county analysis tool 240 that shows the events and the probabilities associated with the events. Thus, in the column 1110 the categories of events are shown, e.g., total events, events with positive basis risk, events with negative basis risk, events within the UNL layer, events within the CWIL layer, events in the UNL layer and CWIL layer, CWIL losses below the layer, and CWIL layer misses. In the column 1120, the actual number of the events for each of the categories is shown. In the column 1130, the probability of each of these categories of events is also displayed. Finally, in the column 1140, the expected basis risk associated with the events for the various categories is shown. Again, a user may explicitly adjust various data in the county analysis to account for this data and make improvements to enhance the fit. These count statistics also provide a manner of incorporating the distribution of basis risk events into the analysis.

FIG. 12 shows an exemplary display 1200 that splits the basis risk by size. That is, instead of aggregating the basis risk for all events, the display 1200 identifies the number of events for various size granularities of basis risk. In the first instance, the events are broken down into three main categories, those events that do not have any basis risk 1210 (e.g., CWIL loss=UNL loss), those events that have positive basis risk 1220 (e.g., CWIL loss>UNL loss) and those events that have negative basis risk 1230 (e.g., CWIL loss<UNL loss).

Within the categories 1220 and 1230, the events are broken down based on the size of each event as shown in the column 1240. For example, events that have a size of greater than $1,000,000; $2,000,000; $3,000,000 . . . $25,000,000. The column 1250 shows the number of events for each category that that meet the size criteria. For example, there are 142,792 events that have a positive basis risk and a size that is greater than $1,000,000. The column 1260 shows the amount of basis risk associated with the events in the various size categories. The column 1270 shows the probability of an event of the size category occurring. Finally, the column 1280 shows the return period for an event of the size category occurring. For example, an event having a negative basis risk of a size greater than $4,000,000 will occur once every 7.53 years.

It should be noted that while FIGS. 8-12 have provided exemplary displays of output data 260 from the county analysis tool 240, the output data 260 may be displayed in any number of manners, such as bar graphs, pie graphs, etc. Moreover, while the individual calculations for each of the values provided in these displays have not been specifically provided, it should be apparent to those skilled in the art based on the description herein as to the manner of deriving these values.

Figure 13:
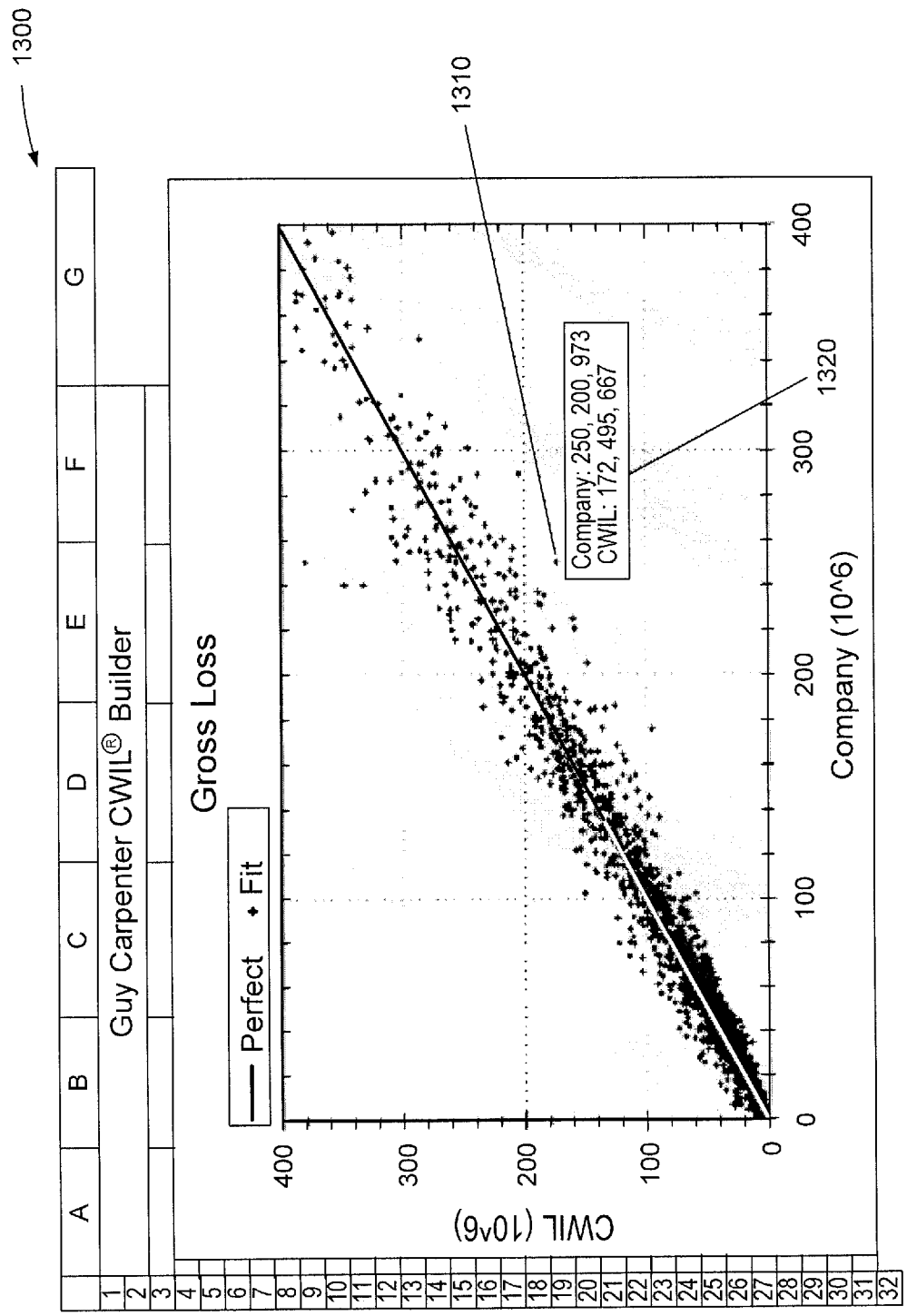
FIG. 13 shows a further exemplary embodiment of a display showing the CWIL loss curve (y axis) versus the UNL company loss curve (x axis) according to the exemplary embodiments.

In another exemplary embodiment, the county analysis tool 240 includes an event explore functionality that allows for micro-level adjustments for event specific basis risks. This functionality will be described with reference to FIGS. 13-17. FIG. 13 shows a further exemplary embodiment of a display 1300 showing the CWIL loss curve (y axis) versus the UNL company loss curve (x axis). In the example of display 1300, each dot represents an event that is fit to the curve. As can be seen from the curve, a significant number of events lie close to the ideal curve. However, there are also some outlier events. The micro-level adjustment functionality may be used to adjust these outliers as needed to possibly move the outliers closer to the ideal curve. In this example, the user has selected the event identified by the dot 1310, e.g., by hovering a mouse cursor over the dot 1310. The selection results in dialog box 1320 appearing on the display 1300. This dialog box 1320 shows that the company or UNL loss is $250,200,973 for this event, while the CWIL loss is $172,495,667. Thus, the dialog box 1320 shows the magnitude of the difference between these losses so that a user can understand the reason for the dot 1310 appearing to be an outlier. The display 1300 may further include the ability to double click the dot 1310 to generate a further event detail display 1400.

FIG. 14 shows an event detail display 1400 for an event selected by the user. The event detail display 1400 will show the event identification for the selected event in the column 1410 as shown by the highlighted box (event id=270165936). The column 1420 shows the rate for the event. The columns 1430 and 1440 show the gross mean company loss ($250,200,973) and the gross mean CWIL loss ($172,495,667) for the event, respectively. The columns 1450 and 1460 show the layer mean company loss ($240,200,973) and the layer mean CWIL loss ($162,495,667) for the event, respectively. The column 1470 shows the basis risk by mean which is the CWIL loss minus the company loss. In this example, the basis risk by mean is −$77,705,306 ($162,495,667−$240,200,973). The column 1480 shows the weight for the event and the column 1490 shows the description of the event. In addition to the selected event, other nearby events may also be shown on the display 1400.

Figure 15:
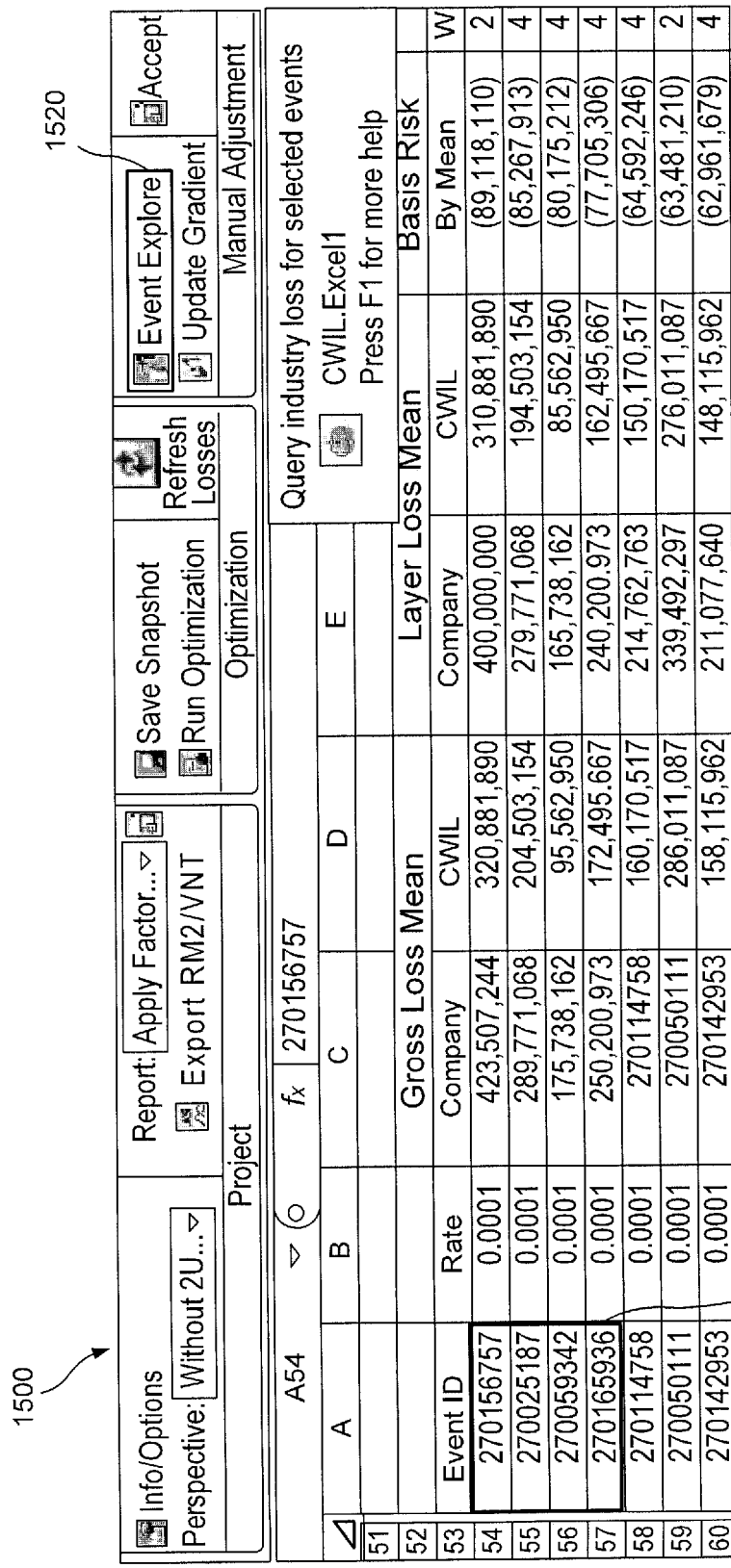
FIG. 15 shows a further event detail display for events selected by the user according to the exemplary embodiments.

FIG. 15 shows a further event detail display 1500 for events selected by the user. In this example, the user has selected a series of events 1510, which includes the originally selected event and then has elected to explore the selected events in more detail by selecting the event explore button 1520. The event explore button 1520 leads the user to an even more detailed event explore tab for the selected events.

Figure 16:
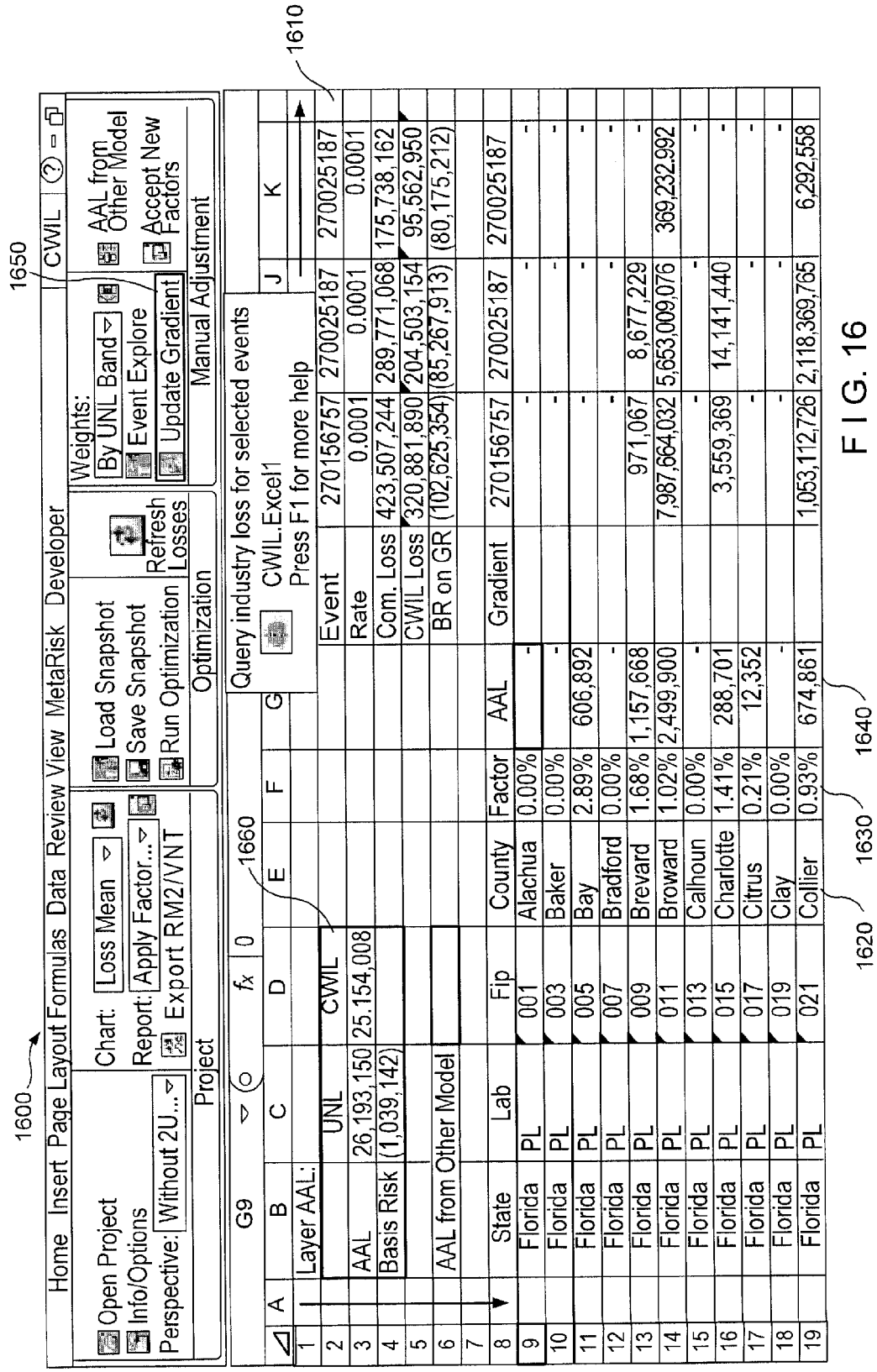
FIG. 16 shows an event explore tab display for events selected by the user according to the exemplary embodiments.

FIG. 16 shows an event explore tab display 1600 for events selected by the user. In this display 1600, each of the selected events is displayed along with its rate, company loss, CWIL loss and basis risk in display area 1610. For each event, the county is shown in column 1620, the county factor is shown in column 1630 and the allocated CWIL county layer loss (labeled "AAL") is shown in column 1640. The allocated CWIL county layer loss is how much the county contributed to the overall layer loss. Thus, in this example, if a user were to scroll through all the listed counties and up all the values in the column 1640, the result would be the CWIL loss of 25,154,008 shown under the Layer AAL portion 1660. This display further includes an update gradient button 1650 that the user may select to make the desired micro-level adjustments to the county factors.

FIG. 17 shows a gradient display 1700 for the events selected by the user. The display 1700 is similar to the display 1600 in that it continues to display the county (column 1710), the county factor (column 1720) and the AAL (column 1730) for the selected event. However, the display 1700 also includes the gradient 1740 for each county. In this exemplary embodiment, the gradient is based on a 1% change in the county's factor. However, a gradient of 1% is only exemplary and any gradient value may be used. In such a manner, a user can see what the changes to the county factor will yield before making any actual changes. As described above, the goal of the analysis is to most closely approximate the company loss curve by the CWIL curve. The gradient shows that micro-level adjustments can be made to certain county factors to move the CWIL loss closer to the company loss.

To provide a specific example, the column 1720 shows that the county factor for Shelby county is 0.130 for this event and the column 1740 shows the gradient for Shelby county is $247,649. This means that an increase of 1% to the county factor for Shelby county from 0.13% to 1.13% for this event will cost the company $247,649. This display 1700 allows a user to see the change in basis risk for a change in the county factor and how much that change will cost to implement in purchasing the security instrument. It is noted that the gradient is shown as a change to one county factor, however, the calculations for all counties and all events that contribute to the CWIL layer loss are performed based on this altered county factor, i.e., not just the county for which the gradient is shown, but for all counties in the system based on the change to the county factor for the single county. Thus, the user can use this information to make adjustments where they are least likely to increase cost.

In addition, the gradient shows the movement for both an increase and a decrease in the county factor. For example, a county may have a positive basis risk. By decreasing the factor for that county, the cost (gradient) may be decreased, while the basis risk remains positive or close enough to zero so that the company is reducing its cost while not taking on unnecessary additional negative basis risk. Thus, the displays of FIGS. 12-16 show an example of the micro-level adjustments that may be made by a user to adjust both the basis risk associated with the security instrument and the cost of the security instrument so that the user may ideally match the CWIL loss to the UNL loss for the lowest possible cost to the company.

Figure 18:
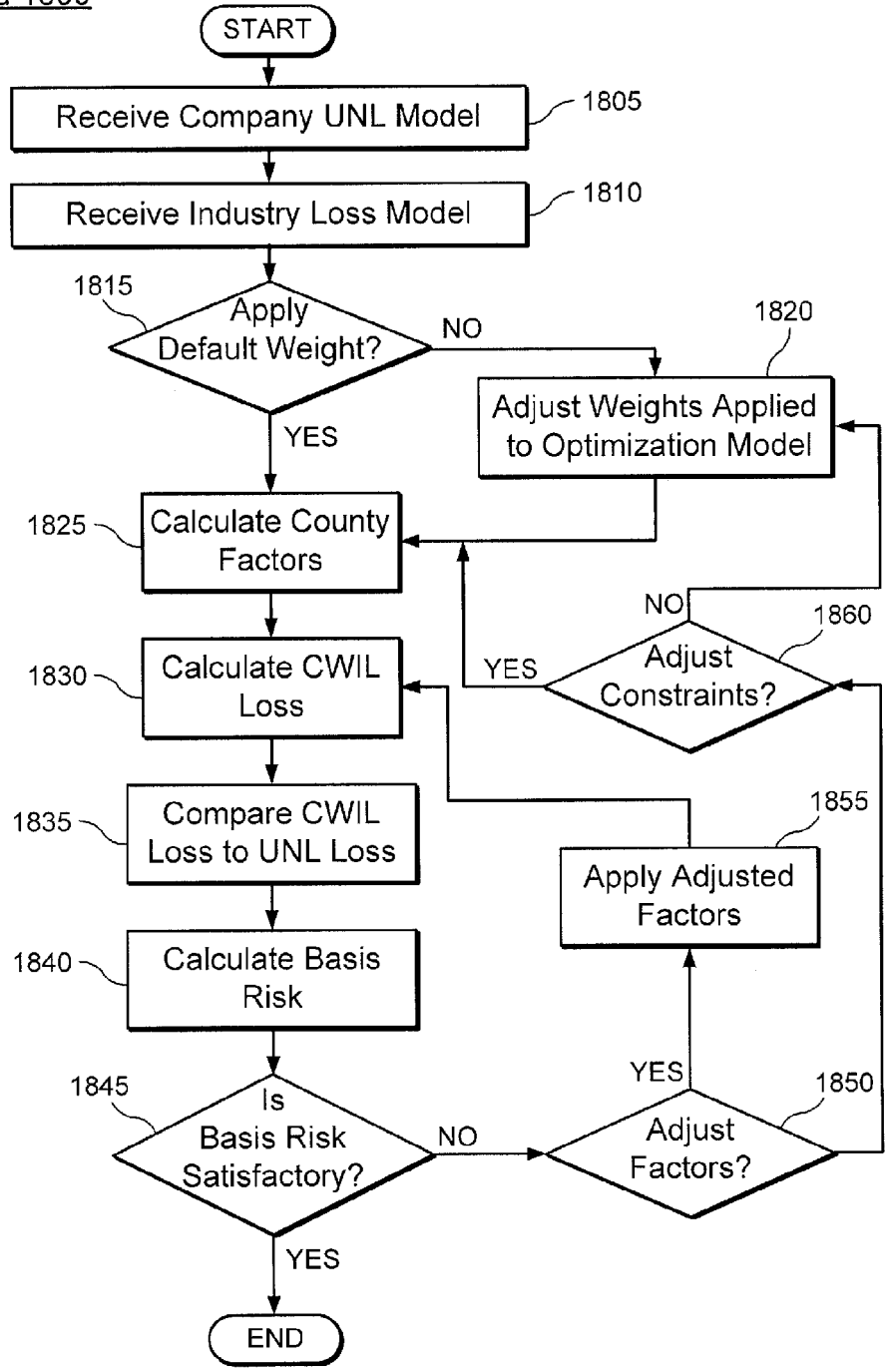
FIG. 18 shows an exemplary method for operation of the county analysis tool according to the exemplary embodiments.

FIG. 18 shows an exemplary method 1800 for operation of the county analysis tool 240 according to the exemplary embodiments. Each of the steps of the exemplary method 1800 has been described in detail above. This exemplary method provides a summary of the exemplary steps that the county analysis tool 240 may perform to provide the user with the desired data. In the first step 1805, the county analysis tool 240 receives the modeled company UNL loss information from the company model component 230. In step 1810, the county analysis tool 240 receives the industry loss model information from the simulated industry loss component 210.

In step 1815 it is determined whether the user desires to apply default weights to the events of the modeled company UNL loss. As described above, the weighting may provide a greater emphasis on those events that fall within the layer of interest. Exemplary manners of providing weights to differing events have been described above. If the user selects not to apply default weights to the events, the method continues to step 1820 where the weights that are applied to the optimization model are adjusted based on user input. If the user selects to apply the default weights in step 1815, default weighting that may be stored within the county analysis tool 240 and selected based on the characteristics of the event, e.g., where in the layer of interest the event mean loss falls, the standard deviation of the event mean loss, etc., may be applied to the events.

After the default weights or user supplied weights have been applied, the method continues to step 1825 where the county factors are calculated. As described above, the calculation of the county factors is an optimization problem based on the weighted (or unweighted) company modeled loss for each event and the industry loss for each event. Exemplary manners of solving the optimization problem have been described in detail above. After the county factors have been calculated, the county analysis tool 240 may then use these calculated county factors to determine the CWIL loss for each of the events. As also described extensively above, the CWIL loss in each county for each event is the product of the calculated county factor and the industry loss for the county.

In step 1835, the calculated CWIL loss is compared to the modeled UNL loss for the purpose of calculating the basis risk statistics in step 1840. The basis risk statistics calculated in step 1840 may include any of the exemplary basis risk described above with respect to the multiple exhibits providing examples of the display of various basis risks to a user. The basis risk statistics also include any of the other attendant values associated with basis risk such as the various percentages, etc. that have been described above. After the basis risk statistics have been calculated, the user may determine if the basis risk analysis has yielded enough information or if the user desires to run a further analysis in step 1845. In normal circumstances, the basis risk analysis is an iterative process and will not yield the optimum result after the first iteration. Thus, if the basis risk analysis is not satisfactory to the user in step 1845, the method will continue to step 1850, where the user will determine whether the user desires to adjust the calculated county factors.

If the user desires to adjust the county factors, the method continues to step 1855 where the county factors are adjusted and then back to steps 1830, 1835 and 1840 for the county analysis tool 240 to calculate the CWIL loss, compare the CWIL loss to the UNL loss and calculate a new basis risk based on the adjusted county factors, respectively. On the other hand, if the user does not desire to adjust the factors directly, the method continues to step 1860 where it is determined whether the user desires to adjust the constraints. If the user desires to adjust the constraints, the method loops back to step 1825 where the county factors are recalculated based on the new constraints and then the steps 1830-1840 are re-performed as described above based on the updated county factors. An example of a constraint that may be adjusted includes the limiting of county factors between 0 and 1 (e.g., 0 and 1000). That is, it may be possible that an insurance company has a market share of less than 0 in a particular county (i.e., negative market share). As described above, the county factor is a proxy for market share and a constraint may be set that all counties have a minimum of 0% market share (i.e., no negative market share). In another example, a constraint may be the grouping of counties into a single entity for the purpose of calculating the county factors. Again, these constraints are only examples and there may be any number of different constraints that may be adjusted and used to calculate the county factors.

If the user does not desire to alter the constraints, but rather desires to adjust the weights applied to the optimization model, the method loops back to step 1820 to adjust the weights and, then, the county analysis tool 240 performs the steps 1825-1840 as described above. Once the user is satisfied with the results of the analysis by the county analysis tool 240, the method 1800 ends because the user has the desired information. As described above, this information may aid the user in determining whether or not to purchase the security instrument, the amount of basis risk associated with the security instrument, the cost of the security instrument, the variations in pricing and basis risk for the security instrument, etc.

It is noted that the method 1800 is not meant to provide all the functionality of the county analysis tool 240, but merely one exemplary scenario of steps the county analysis tool 240 may take to provide the user with the desired information. For example, the above description and figures provided numerous displays with numerous types of information that may be displayed. The method 1800 did not provide the details of these displays or the calculations of this information, but it would be understood that this functionality may also be included within the county analysis tool 240.

As described above, the exemplary embodiments have been described using the expected mean loss as the primary statistic for viewing the data as shown in the exemplary displays. This mean loss view gives the user a particular perspective. However, other perspective views may also be provided by the exemplary embodiments. For example, as described in detail above, the exemplary embodiments may provide the mean loss with the secondary uncertainty parameter (standard deviation) to provide every possible simulation of the events. In this example, the simulations may be performed mathematically because the events can be represented in closed form. However, in another perspective view where the events cannot be represented by a closed form function, all possible outcomes of the modeled events may be simulated to provide this perspective to a user. Thus, from these examples it can be seen that the exemplary embodiments may provide different views of the data to provide users with different perspectives.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. In a further example, the exemplary embodiments of the systems and methods for comparing company losses to industry indices may be a program containing lines of code stored on a non-transitory computer readable storage medium that, when compiled, may be executed on a processor.

Thus, a system of the county analysis tool 240 that comprises a receiving arrangement having hardware, software or a combination thereof that may, for example, perform the steps 1805 and 1810 of the method 1800. The same system may also comprise a calculating arrangement having hardware, software or a combination thereof that may, for example, perform steps 1820, 1825, 1830 and 1855 of the method 1800. The same system may also comprise a comparing arrangement having hardware, software or a combination thereof that may, for example, perform steps 1835 and 1840 of the method 1800. Finally, the same system may also comprise an output arrangement having hardware, software or a combination thereof that may, for example, output the calculated basis risk or any other calculated values described herein. It is noted that the above-described arrangements are only exemplary and that the various arrangements may have its functionalities combined into a single component or distributed to multiple components. For example, the calculating arrangement and the comparing arrangement may be implemented via the same computer code being executed on the same processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent

What is claimed is:

1. A method, comprising:
    calculating, by a computing device, an element factor for each of a plurality of elements based on a modeled company loss for a plurality of events and a modeled industry loss for the plurality of events;
    assigning a weight that modifies the modeled company loss to each event, the weight being based on a value of the modeled company loss for each event in relation to a defined range of losses in a layer of interest for each event, wherein the defined range of losses for each event is less than an entire range of losses for each event;
    modify the modeled company loss for each event based on the weight assigned to the corresponding event;
    calculating, by the computing device, a modeled company index loss for each element based on the element factor and the modified modeled industry loss for each of the corresponding elements for each of a plurality of events; and
    comparing, by the computing device, the modeled company index loss for each element to the modeled company loss for each element for each of the events, wherein the comparing occurs within the layer of interest to determine a basis risk for each of the events.

2. The method of claim 1, wherein each of the elements is a defined geographical area that is one of a county, a group of counties, a zip code, a geocode, a defined coastal area, and an area of landfall for a hurricane.

3. The method of claim 1, wherein the weight is received from one of a user and from a weighting element that automatically provides the weight based on a characteristic of the event.

4. The method of claim 1, wherein the calculating the element factor is performed based on a default weight, the method further comprising:
    receiving one of an updated weight for one or more of the events and an adjusted constraint;
    recalculating the element factor;
    recalculating the modeled company index loss; and
    recomparing the modeled company index loss to the modeled company loss to determine a new basis risk.

5. The method of claim 1, further comprising:
    calculating a price of a security instrument based on the modeled industry loss and the basis risk.

6. The method of claim 1, further comprising:
    receiving the modeled company loss from a CAT model element, wherein the modeled company loss is an ultimate net loss (UNL).

7. The method of claim 1, further comprising:
    storing tags to identify characteristics of each event, wherein the basis risk of each event is aggregated based on the characteristics of the events.

8. The method of claim 1, further comprising:
    determining whether the basis risk is a positive basis risk or a negative basis risk.

9. The method of claim 1, wherein the modeled company index loss is one of a mean loss for each event and a standard deviation for each event.

10. The method of claim 1, further comprising:
    receiving information identifying the layer of interest.

11. The method of claim 1, further comprising:
    calculating further information based on the basis risk for each event, the further information including one of a number of events having positive basis risk, a number of events having negative basis risk, a number of events whose mean loss hits the layer of interest, a number of events whose mean loss misses the layer of interest, the event having the largest basis risk, a cumulative total of positive basis risk for all events, a cumulative total of negative basis risk for all events, a cumulative total of basis risk within the layer of interest, a cumulative total of basis risk above the layer of interest, a cumulative total of basis risk below the layer of interest, a positive basis risk bias, a negative basis risk bias, an efficiency value corresponding to the modeled company index loss divided by the company modeled loss, a positive basis risk for each element, and a negative basis risk for each element.

12. The method of claim 1, wherein the layer of interest is divided into a plurality of sub-layers and the basis risk is output based on the sub-layers of the layer of interest.

13. The method of claim 4, further comprising:
    determining an improvement of the new basis risk versus the basis risk; and
    stopping the calculating when the improvement is less than a predefined threshold.

14. A system, comprising:
a memory to store a modeled company loss for a plurality of events, a modeled industry loss for the plurality of events, and tags to identify characteristics of each event, the characteristics relating to at least one geographic characteristic and at least one non-geographic characteristic;
a processor configured to calculate an element factor for each of a plurality of elements based on the modeled company loss for the plurality of events and the modeled industry loss for the plurality of events, the processor is further configured to assign a weight that modifies the modeled company loss to each event, wherein the weight is based on a value of the modeled company loss for each event in relation to a defined range of losses of a layer of interest, wherein the defined range of losses for each event is less than an entire range of losses for each event, the processor further configured to modify the modeled company loss for each event based on the weight assigned to the corresponding event, the processor further configured to calculate a modeled company index loss for each element based on the element factor and the modified modeled industry loss for each of the corresponding elements for each of a plurality of events, the processor further configured to compare the modeled company index loss for each element to the modeled company loss for each element for each of the events, wherein the comparing occurs within the layer of interest to determine a basis risk for each of the events, wherein the basis risk of each event is aggregated based on the characteristics of the events; and
an output arrangement outputting a monetary value of the basis risk for each of the events based on each of the elements.

15. The system of claim 14, wherein each of the elements is a defined geographical area that is one of a county, a group of counties, a zip code, a geocode, a defined coastal area, and an area of landfall for a hurricane.

16. The system of claim 14, wherein the processor is configured to calculate the element factor based on a default weight, the memory stores one of an updated weight for one or more of the events and an adjusted constraint, and the processor is further configured to recalculate the element factor, recalculate the modeled company index loss and recompare the modeled company index loss to the modeled company loss to determine a new basis risk.

17. The system of claim 14, wherein the memory stores an adjusted element factor for at least one of the elements, the processor is further configured to recalculate the modeled company index loss based on the adjusted element factor and the recompare the modeled company index loss to the modeled company loss to determine a new basis risk.

18. The system of claim 14, wherein the processor is further configured to calculate a price of a security instrument based on the modeled industry loss and the basis risk.

19. The system of claim 14, wherein the output arrangement outputs further information based on the basis risk for each event, the further information including one of a number of events having positive basis risk, a number of events having negative basis risk, a number of events whose mean loss hits the layer of interest, a number of events whose mean loss misses the layer of interest, the event having the largest basis risk, a cumulative total of positive basis risk for all events, a cumulative total of negative basis risk for all events, a cumulative total of basis risk within the layer of interest, a cumulative total of basis risk above the layer of interest, a cumulative total of basis risk below the layer of interest, a positive basis risk bias, a negative basis risk bias, an efficiency value corresponding to the modeled company index loss divided by the company modeled loss, a positive basis risk for each element, and a negative basis risk for each element.

20. The method of claim 1, further comprising:
outputting a monetary value of the basis risk for each of the events based on each of the elements.

21. The method of claim 1, further comprising:
receiving, by the computing device, an adjusted element factor for at least one of the elements, wherein the adjusted element factor is based on a predetermined adjustment amount;
calculating, by the computing device, an adjusted modeled company index loss for each of the elements based on the adjusted element factor and the modeled industry loss;
displaying a representation of the at least one of the elements, the element factor for the at least one of the elements, the modeled company index loss for the at least one of the elements and the adjusted modeled company index loss for the at least one of the elements; and
comparing the adjusted modeled company index loss to the modeled company loss to determine a new basis risk.

22. A non-transitory computer readable storage medium with an executable program stored thereon, wherein the program instructs a processor to perform operations, comprising:
calculating an element factor for each of a plurality of elements based on a modeled company loss for a plurality of events and a modeled industry loss for the plurality of events;
assigning a weight that modifies the modeled company loss to each event, the weight being based on a value of the modeled company loss for each event in relation to a defined range of losses in a layer of interest for each event, wherein a the defined range of losses for each event is less than an entire range of losses for each event;
modify the modeled company loss for each event based on the weight assigned to the corresponding event;
calculating a modeled company index loss for each element based on the element factor and the modified modeled industry loss for each of the corresponding elements for each of a plurality of events; and
comparing the modeled company index loss for each element to the modeled company loss for each element for each of the events, wherein the comparing occurs within the layer of interest to determine a basis risk for each of the events.

* * * * *